United States Patent [19]

Gallagher

[11] Patent Number: 5,152,417
[45] Date of Patent: Oct. 6, 1992

[54] RINGLESS PAINT CONTAINER WITH DRIP FREE LID

[75] Inventor: Thomas A. Gallagher, Chagrin Falls, Ohio

[73] Assignee: Van Dorn Company, Cleveland, Ohio

[21] Appl. No.: 750,113

[22] Filed: Aug. 26, 1991

Related U.S. Application Data

[63] Continuation-in-part of Ser. No. 629,431, Dec. 18, 1990, which is a continuation-in-part of Ser. No. 528,531, May 25, 1990, which is a continuation-in-part of Ser. No. 335,566, Apr. 10, 1989, Pat. No. 4,936,482, which is a continuation of Ser. No. 120,471, Nov. 13, 1987, Pat. No. 4,880,131.

[51] Int. Cl.⁵ ............................................. B65D 43/00
[52] U.S. Cl. .................................... 220/355; 220/356
[58] Field of Search ................ 220/355, 356, 669, 306

[56] References Cited

U.S. PATENT DOCUMENTS

| | | | |
|---|---|---|---|
| 132,356 | 10/1872 | Curtis | 220/356 |
| 1,419,314 | 6/1922 | Sexton | |
| 1,603,330 | 10/1926 | Dister | 220/356 |
| 1,954,568 | 4/1934 | Kenny | 220/42 |
| 1,997,291 | 4/1935 | Barroll | 220/42 |
| 2,060,504 | 11/1936 | Kjellstrom | 220/42 |
| 2,734,654 | 2/1956 | Roberson | 220/355 |
| 3,056,525 | 10/1962 | Deinert | 220/21 |
| 3,170,590 | 2/1965 | Ullman | 220/91 |
| 3,333,728 | 8/1967 | Burdick | 220/60 |
| 3,732,909 | 5/1973 | Rooke et al. | 150/0.5 |
| 3,944,115 | 3/1976 | Moonan et al. | 220/355 |
| 4,421,247 | 12/1983 | Lombardo et al. | 220/354 |
| 4,846,366 | 7/1989 | Satz | 220/356 X |
| 4,880,131 | 11/1989 | Gallagher | 220/83 |
| 4,887,735 | 12/1989 | Dudzik | 220/355 X |
| 4,936,482 | 6/1990 | Gallagher | 220/83 |

FOREIGN PATENT DOCUMENTS 170523  11/1974  New Zealand .

*Primary Examiner*—Steven M. Pollard
*Attorney, Agent, or Firm*—Body, Vickers & Daniels

[57] ABSTRACT

An especially configured, ringless, container-lid design is disclosed having improved sealing characteristics applicable to paint containers for the consuming public. The rim portion of the container is provided with a tapered, especially shaped wall section terminating in a curled bead which is received in a sealing groove in the lid. The container rim section is rigidized by a single protrusion in the form of a stiffening groove to prevent vertical collapse of the container. The lid has an inverted U-shaped groove sealingly engaging the container's bead. Extending from the inner wall segment of the U-shaped groove in the lid is a frusto conical wall segment extending radially-inwardly and vertically-upwardly to a flat, annular, radially-inwardly extending surface which in turn terminates in a downwardly-extruding frusto conical surface so that a raised collecting basin is formed in the lid. The collecting basin provides a mechanism resisting lid sealing groove deformation when the lid is pierced for tint plug insertion while effectively providing an ingress-egress path for paint flow to prevent any potential for paint leakage during mixing of the paint in automatic shaker machines.

3 Claims, 13 Drawing Sheets

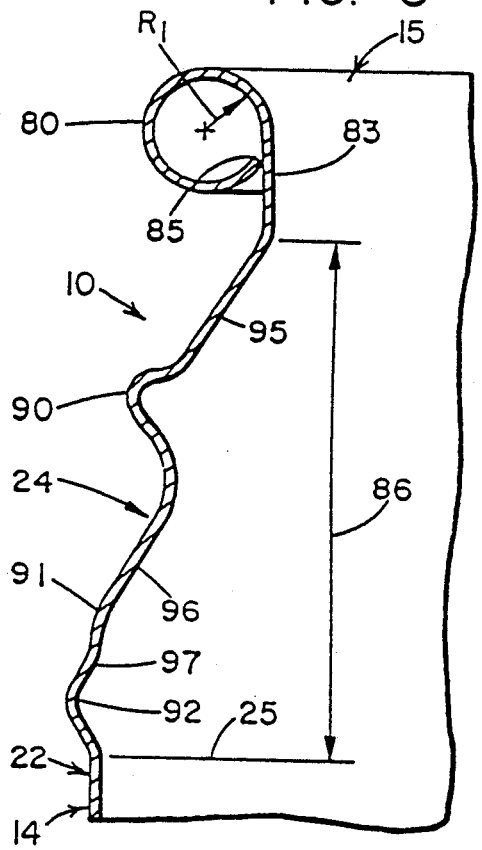
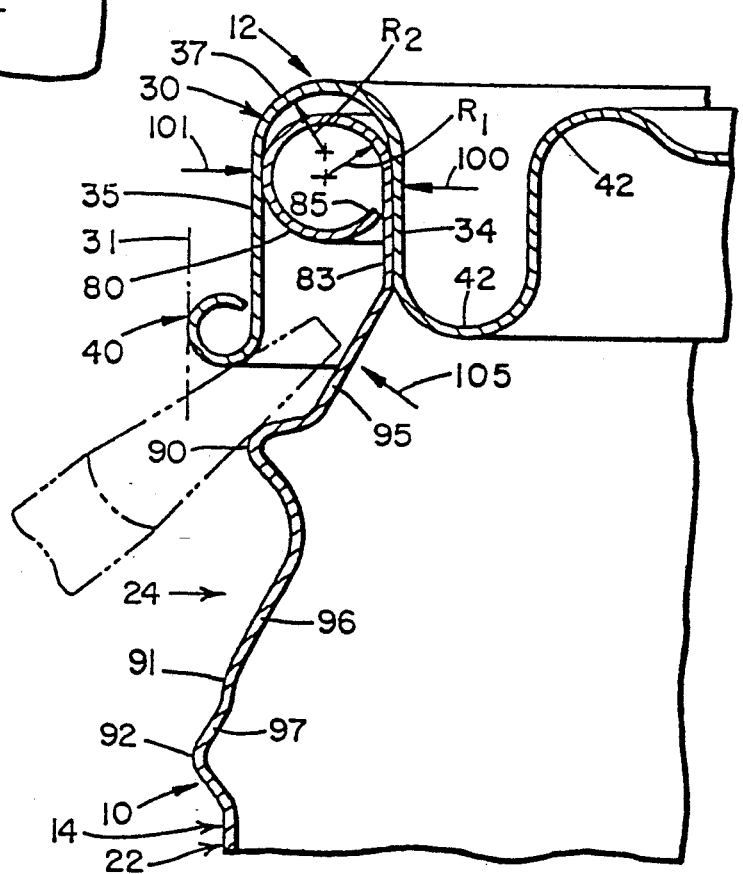

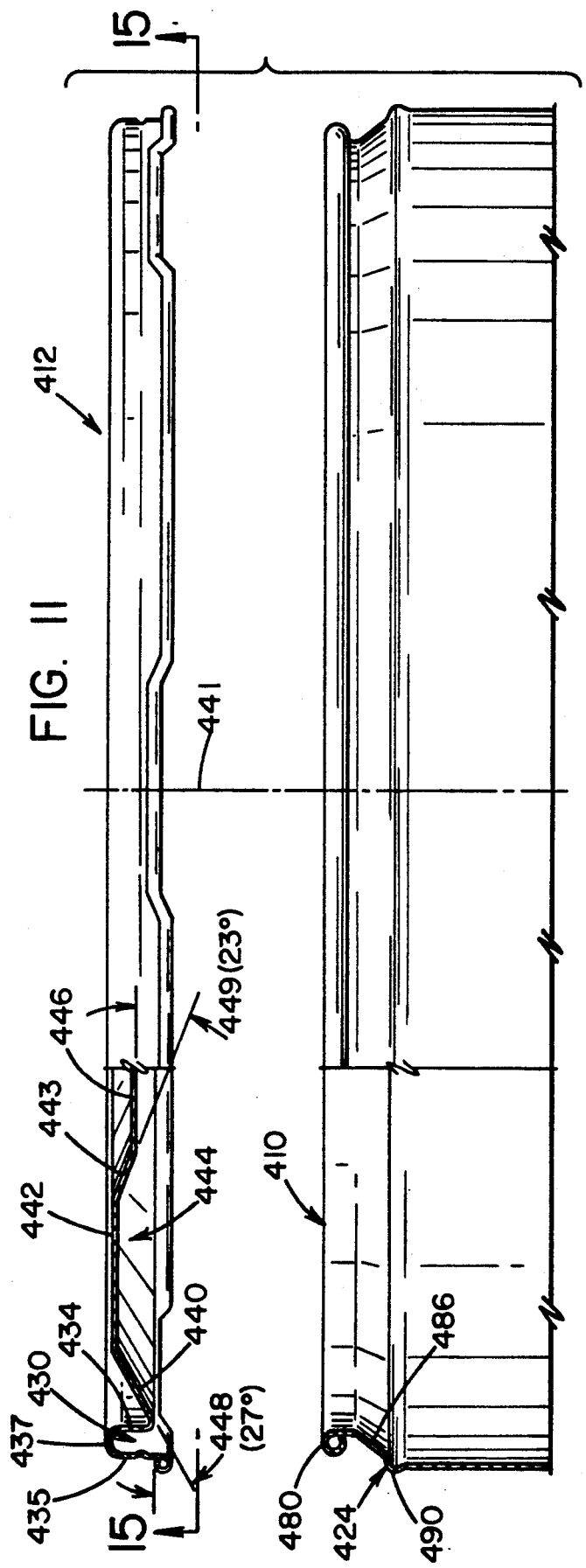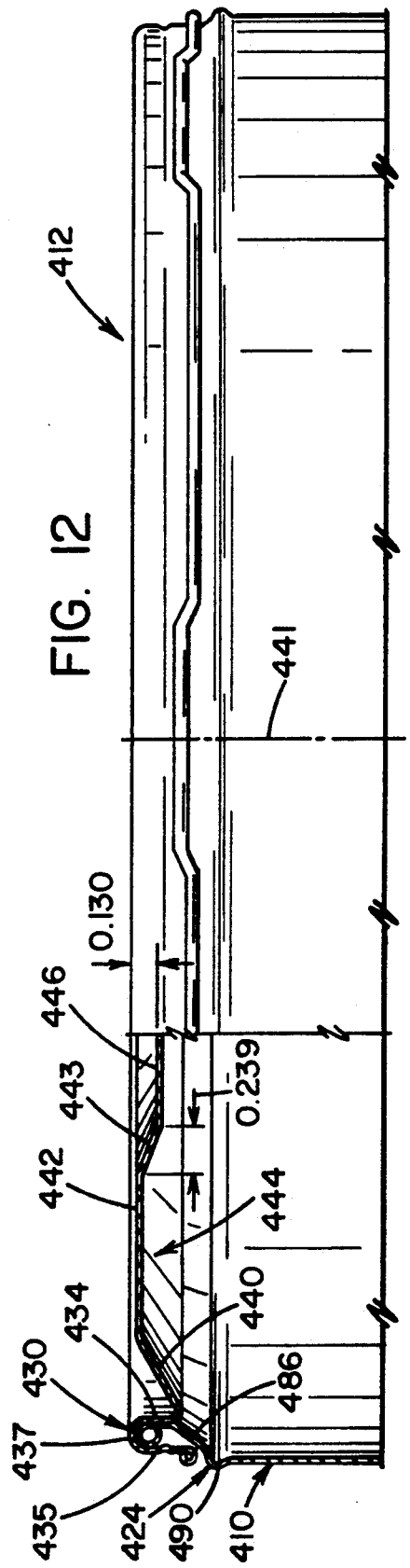

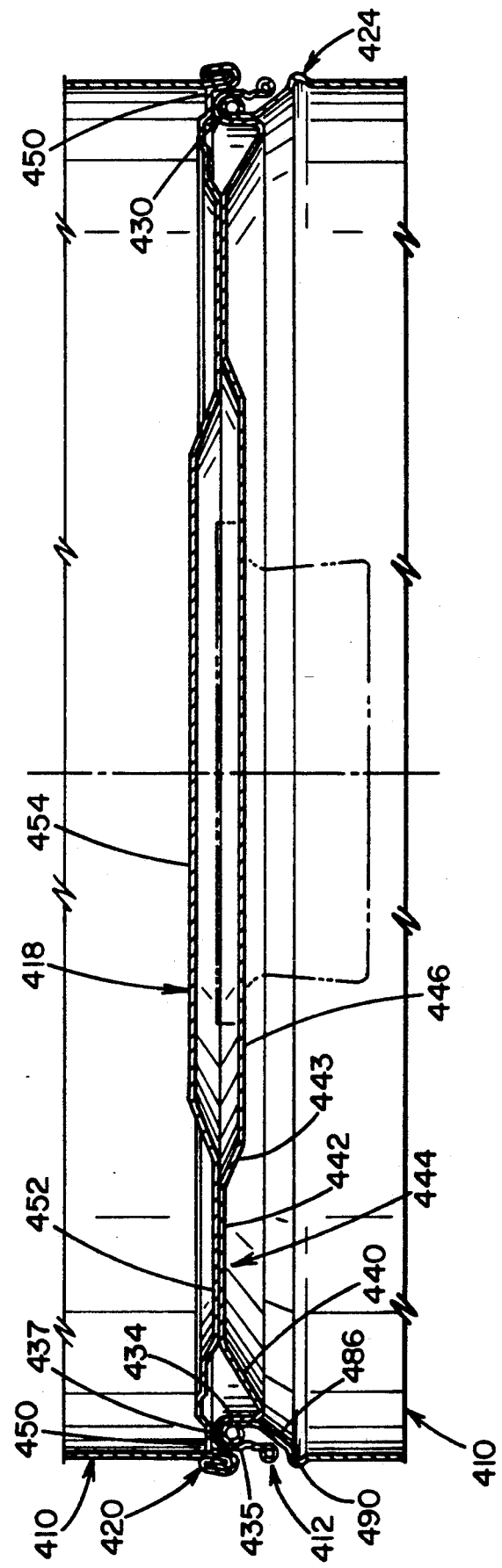

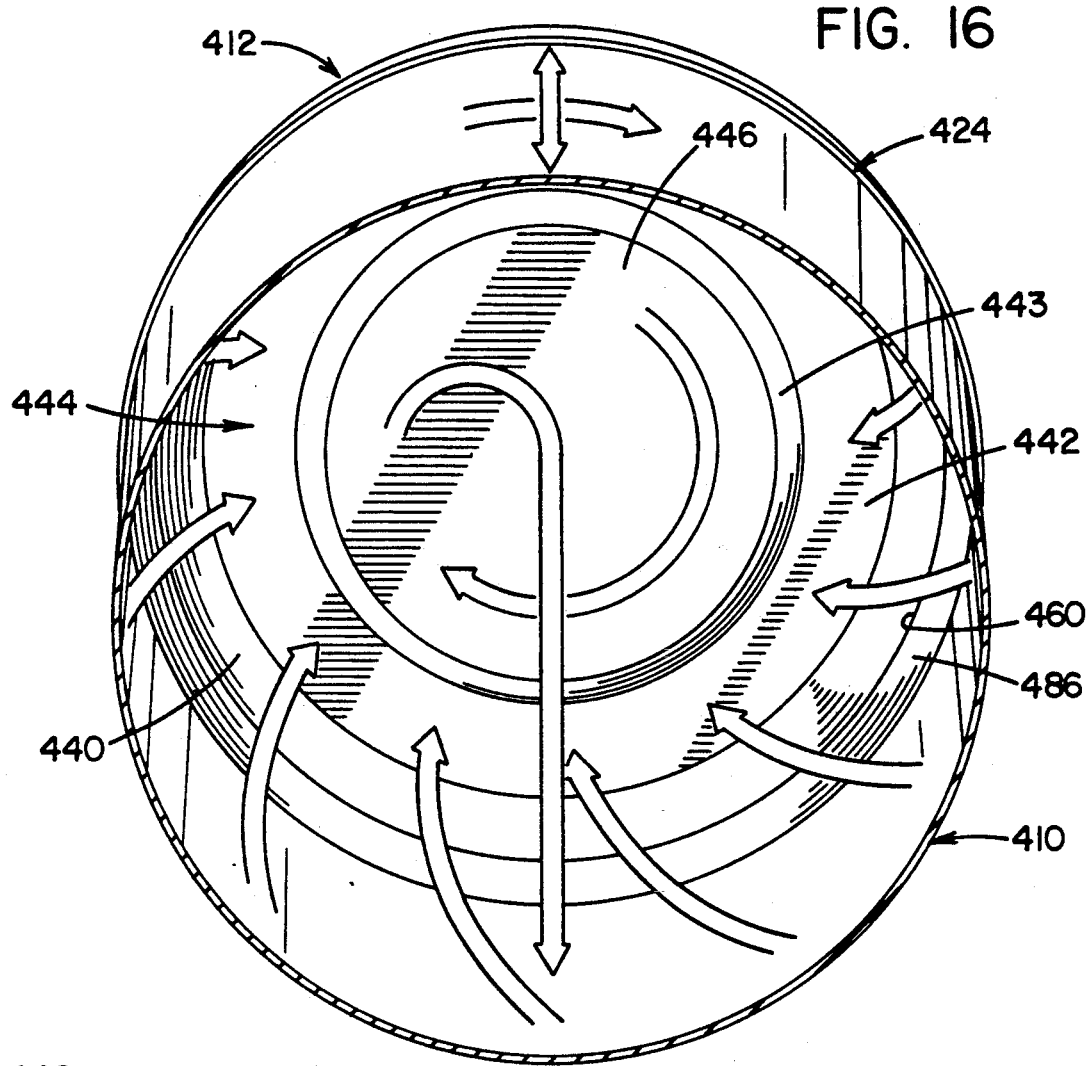
FIG. 16
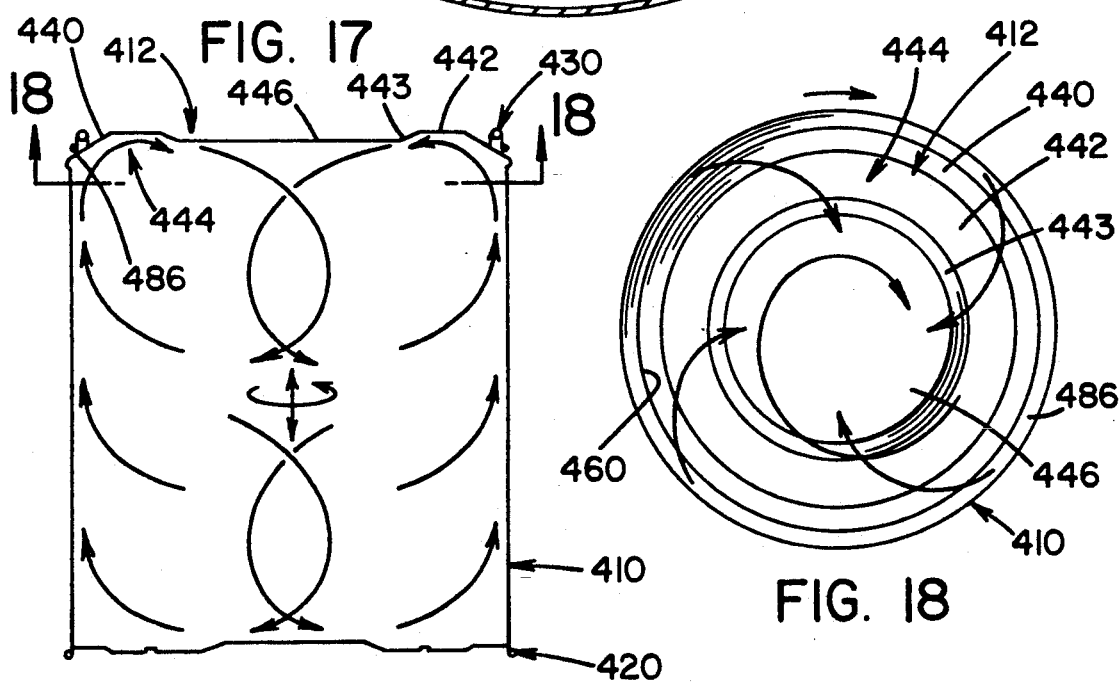
FIG. 17
FIG. 18

RINGLESS PAINT CONTAINER WITH DRIP FREE LID

This application is a continuation in part of U.S. application Ser. No. 629,431 filed Dec. 18, 1990 which is in turn a continuation-in-part of U.S. application Ser. No. 528,531 filed May 25, 1990 which in turn is a continuation-in-part of U.S. application Ser. No. 335,566 filed Apr. 10, 1989 now U.S. Pat. No. 4,936,482 dated Jun. 26, 1990 which in turn is a continuation of U.S. application Ser. No. 120,471 filed Nov. 13, 1987 now U.S. Pat. No. 4,880,131 dated Nov. 14, 1989.

This invention relates generally to metal containers with removable, resealable lids and more particularly to a ringless container in combination with a resealable drip free lid.

The invention is particularly applicable to and suitable for use as a container for paints, varnishes, stains and the other liquids sold to the consuming public and will be described with particular reference thereto. However, it will be appreciated by those skilled in the art that the invention has broader application and may be used as an air-tight container for any liquid or other substance which requires repeated on/off sealing applications of the container's lid.

BACKGROUND OF THE INVENTION

A. Ring Cans

Conventional metal containers, particularly paint containers and the like used by the consuming public are cylindrical in shape, and typically comprise a container body, a bottom plate closing one end of the container, a ring which is secured to the open end of the container and a lid or a plug which fits into the ring to close the container. Reference may be had to U.S Pat. No. 4,421,247 to Lombardo et al for a typical example showing the plug and ring construction and the fit therebetween.

The cylindrical container body is usually formed from a rectangular flat piece of sheet metal rolled into a cylinder with the sides joined together by a continuous soldered side seam and a circular bottom plate is then attached, usually by a crimped double seam, to one of the open ends of the cylinder. At the other end of the cylinder, an annular, grooved ring member is similarly attached. Various types of seams can be used and some container are simply drawn or stamped into a one piece container body although the seamed construction described is widely used.

Paint containers of the type described have proven acceptable for their intended function and use. There are, however, a number of drawbacks which are principally centered about or arise because of the ring and plug construction described.

From the viewpoint of a can manufacturer, the ring is an unnecessary appendage which, if removed, would materially simplify the container. That is the container could be manufactured with less metal. The container could also be manufactured quicker and more easily because making the ring and then seaming the ring to the container's side wall opening would not be required. Thus, if the ring could be eliminated, the cost of the container would materially decrease.

From the consumer's viewpoint, the ring is undesirable because, despite several patented concepts to the contrary, the ring collects paint and prevents the container from being resealed in an air-tight manner. The ring also inhibits the ability of the user to pour the contents of the container. The ring also prevents all the contents of the container from being emptied.

A less obvious drawback of the plug-ring design is that stacking or nesting of the containers, one on top of the other, cannot occur with conventional designs. Stacking is important from both a shipping and dealer inventory standpoint. Such a feature is simply not readily available with conventional designs because the ring sealing grooves interfere with or prevent the formation of a plug or lid which can function as an interlocking member.

Within the container art, the ring is viewed as a necessary evil which is required to meet the stringent requirements of the paint industry so that, at least initially, an air-tight, shock resistant seal is achieved for the container body. Inherent in the ring-plug seal approach is the elimination of any problems which might otherwise result in attempting to seal, in a repeatable manner, a soldered seam. That is the container is rolled and maintained in a cylindrical shape by a longitudinal soldered seam which extends the entire length of the container. More precisely, each longitudinal end of the container is formed as a "U" and the ends are interlocked, crimped and soldered. The soldered seam is thus four times the thickness of the metal. By crimping the ring to the open end of the container and over the soldered seam permits the plug to be sealed within seamless grooves formed in the ring. The ring-plug seal is taught in the container art as being effective because of the multiplicity of sealing surfaces. In practice, it is believed that the ring-plug closure initially operates as a seal because i) there is no soldered seam to seal and ii) an interference fit is established between the ring and the plug. That is, as the plug is wedged into the ring, various interference fits are formed by opposing wedge angles between the plug and ring which permanently deform the metal so that the lid is prevented from popping off when the container is dropped. Inherently, the effectiveness of the interference fit is diminished once the plug is removed from and then reapplied to the ring since the metal has already undergone a plastic deformation.

B. Ringless Cans

The prior art has long recognized the drawbacks attributed to plug-ring containers, and have developed numerous ringless designs principally to achieve a curled mouth opening in the container for enhanced pourability. U.S. Pat. Nos. 1,419,314 to Sexton and 2,060,504 to Kjellstrom are examples of early ringless paint container designs. Ringless nonpaint container designs which are made from plastic, not sheet metal (to which the present invention relates) include U.S. Pat. No. 3,056,525 to Deinert and 3,732,909 to Rooke et al and are cited to simply show various locking closures, in plastic, which have certain sealing attributes. A paint container of a conventional sheet metal design which is not entirely dissimilar to that of the parent invention is shown in U.S. Pat. No. 3,333,723 to Burdick. Also, a hybrid design in the sense that a ring is employed with a curled opening is disclosed in U.S. Pat. No. 1,997,291 to Barroll. The Barroll concept, in various forms but always using a ring, is in use today on rectangular or oblong metal containers.

1. Structural Defects of Prior Art Ringless Cans

The ringless designs, despite the many claims and assertions made, are not suitable for today's paint containers. For one thing, today's paint containers are dimensionally standardized (within limits). Any newly designed can to be commercially successful must be compatible with existing manufacturing equipment and more importantly, with existing filling facilities. Secondly, the test standards for today's paint containers are stringent. Unique to paint container applications is the force developed within the container at various areas about the inside of the lid from the paint or fluid within the container which acts to pry the lid off when the paint container is dropped or when the container is impacted on its side such as when it enters a labelling machine or a shaker or is otherwise subjected to overall general abuse. In general, the uneven forces act to loosen the lid on the prior art ringless container designs and break the air-tight seal which was initially established when the lid was applied to the container. This principally results because there are only two annular seal areas in such designs and this results in an insufficient interference fit when contrasted to that fit established in the ring-plug closure. Additionally, when the lid must snap over a soldered bead which extends around the mouth of the container, the sealing of the container becomes especially difficult. Further, today's paint industry has developed other tests besides the shock test which prior art container designs were not subjected to at the time of their development and which, it is believed, would not be met by such containers today.

Much of the ringless can prior art did not recognize that something had to be done to the container mouth to rigidize the container and maintain the seal. For example, there are countless attempts to draw a ringless container in the prior art. All such attempts would not produce a container with sufficient strength to meet today's structural requirements because of reducing sheet metal gauge thickness at bend points which occurs during the drawing process. Also there is at least one prior art disclosure, New Zealand Application 170,523 published Nov. 7, 1974 which discloses a ringless design with provisions for an easy pry of the lid, but as a result thereof, totally lacks any rigidity of the mouth. On the other hand, some of the prior art recognized that something must be done to rigidize or strengthen the curled bead opening while also providing some mechanism for removing the lid. Thus, in Ullman No. 3,170,590 and Kenny 1,954,568, the side wall of the containers is rigidized. In Ullman, a bead in the shape of a truncated cone is formed in the side wall and in Kenny a gradually shaped reverse curve is formed in the side wall. Ullman's side wall bead presents an objectionable protrusion whereas Kenny's configuration provides no easy pry for the lid. Burdick No. 3,333,723 provides a sharp V-shaped groove in the side wall which rigidizes the mouth while also providing a pry point, and Burdick's container has been commercially used as a shoe polish container. The V-shaped protrusion is not acceptable for the paint can application of the present invention since it cannot be easily formed or easily formed without distorting the thickness of the metal.

ii) Abusive Consumer User

Apart from all of the above, the paint can to which the present invention relates is a container sold to the consuming public and as a result thereof, is subject to abuses which otherwise might not occur. A typical abuse is when the consumer, after using some of the paint in the container, reapplies the lid by striking the lid with a hammer with such a force that the hammer deforms the sidewall of the container. Surprisingly, it is this abuse that the ring type can is best able to withstand because the ring rigidizes the container's mouth. Even so, once the plug is wedged into the ring, continued hammer blows deform the ring and ruin the seal. Usually, but not always, the consumer sees the side of the can cave in and stops hammering.

A similar abuse has been found to occur in some paint stores which use a 5 gallon paint shaker to mix or tint paint in 1 gallon cans. The clamping pressure in this type of 5 gallon shaker has been observed in at least one random incident to have been s high that the container sidewall is deformed. When this occurs in a ring type can, the plug-ring seal is, as noted, usually destroyed but the consumer, who will use the paint almost immediately, is not aware of the broken seal because the lid can still be removed and reapplied. When such abuses occur on a ringless can, the mouth of the ringless can could become so distorted, that the seal is lost and the lid could become so mashed into the body side wall that removal of the lid becomes difficult.

In addition to the above problems affecting the structural integrity of the containers, principally the application of 5 gallon shakers, (which does not occur often enough to adversely affect the original embodiment of the invention) more subtle concerns have been raised recently concerning paint or the liquid contents of the containers dripping from the lid at the tinting stations in paint stores. Conceptually, there are three potential problems. First, when the lid of a ringless container is removed, paint or the liquid has a tendency to fill some portion of the inverted U-shaped sealing groove formed at the peripheral edge of the lid depending how the lid is flipped upside down. The same thing occurs in a conventional plug lid i.e., paint flowing into the interference grooves formed in the plug depending on how the lid is turned upside down. In a ring can the painted filled groove in the plug or lid spreads out to the adjacent groove and excess paint simply collects on the ring when the plug or lid is wedged into the ring grooves. In a ringless can, with a lid configuration similar to that of the conventional ring plug or lid, the paint can squirt from the groove and trickle down the side of the container. This is viewed as objectionable.

Secondly, tint plugs are being used more frequently in paint stores. In order to save time in prying open the lid from the can body, a central opening is pierced in the plug or lid by a machine such as a Miller Acutinter which resembles an arbor press. This machine uses a piercing die (a Miller pierced tool) which pierces a circular opening in the lid while simultaneously folding the edges of the cut blank over each other and depositing the blank in the filled container. The paint pigment or tint is then added to the container, a plastic tint plug is pressed into the cut opening, and the container is shaken.

Tinting in this manner does not destroy the interference fit seal between can and plug in a ring can since the container is never opened. Also, the various interference fits established when the lid is sealed to the body at the factory provides a tensioning of the central portion of the lid which tends to make the plug better able to withstand the piercing action of the press without deformation. The seal of a ringless can mouth is an entirely different concept and can be adversely affected by deformation to the lid from the Acutinter machine.

Increasing the thickness of the lid will not necessarily resolve the problem of lid deformation or seal upset. Again, the problem of some seal upset or lid deformation does not result in a defective container. However, it is desirable that there be no seal upset and/or lid deformation. Lid deformation can result in a third problem which has been noticed to have occurred randomly when tint plugs have been used with a certain type of a paint shaker, a Harbil machine coupled with they vertically rotating motion of the mixer, which operates like a gyroscope in that the container is rotated while it is vertically displaced. This motion spins or twirls the contents of the container while the liquid is directed forcefully against the lid. Because the lid has been somewhat unseated by the puncturing action of the arbor press, and because of the way the lid is gripped while in the Harbil machine, occasionally paint, i.e., stain, has been observed to leak past the sealing groove during shaking.

SUMMARY OF THE INVENTION

It is thus a principal object of the invention to provide a ringless container with a resealable lid which is suitable for use as a metal paint type container.

A. The Genealogy String

This object along with other features of the invention is achieved by means of a cylindrical container in combination with a removable resealable lid. The lid comprises a generally flat base having a generally circular periphery and at least one annular sealing groove formed adjacent its peripheral edge. The lid's sealing groove is defined by vertically-extending inner and outer sealing wall segments with a bight wall segment therebetween, thus forming an inverted U-shaped groove. The container has a generally cylindrical, longitudinally-extending side wall with a circular bottom wall at one end of the side wall and a generally circular open end at the opposite end of the side wall. More specifically, the container side wall has a configured, frusto-conical rim portion adjacent its open end and a generally cylindrical body portion extending from its bottom end to the rim portion. The rim portion is adapted to sealingly receive the lid for closing the open end of the container and includes i) the top end of the side wall curled into a circular bead for sealingly engaging the sealing groove of the lid, ii) a frusto-conical wall adjacent the bead which permits some resilient movement of the container side wall while maintaining the bead in sealing engagement with the lid's inner and outer sealing wall should there be a shock imparted to the container, and iii) rigidizing means associated with the frusto-conical wall for longitudinally strengthening the rim portion. The rim portion, by being necked down in a frusto-conical manner through a smaller mouth opening inherently produces longitudinal rigidity in the rim portion of the container. The rigidizing means in the rim portion of the container preferably includes only in a single reverse bend formed in the frusto-conical wall segment adjacent the body portion of the side wall with the first bend sharper than the second bend to form a relatively sharp protrusion in the shape of an annular groove whereby the rim portion can be readily formed while the rim portion is maintained sufficiently rigid such that the container can function as a paint can or like container.

Yet another feature of the invention relates to the fact that the rim portion of the container is formed only by bending and rolling the container so that the sheet metal thickness of the rim portion is not elongated or reduced in area such as what might occur if the container were formed by a drawing operation thus insuring the desired resilient characteristics of the rim portion and dimensional accuracy of the container. Further to this feature of the invention the sheet metal gauge of the container is selected to assure the desired resiliency of the rim portion of the container. The overall diametrical relationship between the annular sealing groove formed in the lid and the circular curved sealing bead formed in the container's mouth is such that at a "rest" or unassembled position, the bead has a slightly larger dimension than the annular sealing groove, which in turn has an indentation in the form of an annular groove formed in its outer sealing wall. The resiliency of the bead permits the lid to be snapped into place vis-a-vis the indentation nesting into the underside of the bead. Because there is not significant plastic deformation of the metal when the lid is applied, the lid can be constantly reapplied to the container with consistently good seals.

Because the container is rolled, the cylindrical body shape must be formed by a longitudinally-extending side wall seam and the deleterious effects of the side wall seam on the seal between the lid and the rim portion of the container are minimized by resistance welding the longitudinal side wall seam ends one another so that the thickness of the welded seam is less than twice the thickness of the side wall with an extremely small overlap therebetween to minimize any bulge in the circular bead of the container mouth which could adversely affect container sealing.

In accordance with still another feature of the invention a slight recess is formed in the bottom wall of the container which extends into the container's opening. This recess is sized to be slightly larger in diameter than the diameter of the outermost annular wall segment of the U-shaped sealing groove formed in the lid. The lid of the container is constructed such that the inverted U-shaped groove extends above the base portion of the lid. Thus the containers can be nested, one on top of the other (with or without the lids attached), by a recess having a small depth which acts substantially over an area approximately equal to the diameter of the container to securely stack the containers in a positively interlocking manner.

In accordance with another aspect of the invention a collapse preventing mechanism is formed in the outer sealing wall segment of the lid and acts in conjunction with the stiffening arrangement in the container i.e., the annular groove, for preventing deformation of the mouth and rim portion of the container in the event excessive sealing forces are applied to the lid while also providing pry openings for removal of the lid. More specifically, the collapse preventing mechanism includes the outer sealing wall segment of the lid having a plurality of long length and short length sections with each section extending for discrete arcuate increments about the circumference of the outer sealing wall segment. The long length sections have a longitudinal distance sufficient to contact the annular stiffening groove should excessive sealing force be applied to the lid thus transferring the excessive force to the container's side wall where it can be dissipated without distorting the seal between the lid and beaded opening.

In accordance with a still further feature of the invention, the longitudinal distance between the bight wall of the lid's annular groove and the top of the beaded opening of the container is about equal to or greater than the longitudinal distance between the bottom of the lid's long length section and the stiffening groove when the lid is normally applied to the container and the bottom of the lid contacts the stiffening groove when the excessive sealing force is applied without distorting the rim portion of the container whereby the seal between the lid and the container is not adversely affected. Further, a foam sealant applied either to the bight wall of the annular sealing groove or to the top of the circular beaded opening besides functioning as a sealant also acts as a dampening mechanism tending to return the lid to its normal position after application of the excessive sealing force.

B. The Present Invention

In accordance with the present invention, there is provided the combination of a ringless metal container with a removable, resealable lid for sealing liquid contents therein including a container having a cylindrical body portion, a mouth opening formed as a curled bead and a rim portion extending from the mouth opening to the body portion with the mouth opening smaller in diameter than the body portion so that the rim portion tapers therebetween and a stiffening mechanism is provided at the juncture of the rim portion with the body portion for strengthening the rim portion. A lid having a generally circular configuration is provided with an annular sealing groove extending about its periphery and the sealing groove is defined by annular, vertically extending inner and outer sealing wall segments with a bight wall segment longitudinally-extending therebetween. The inner sealing wall segment terminates in an annular, frusto-conical drip wall segment extending radially inwardly and vertically upwardly toward the bight wall segment and the frusto-conical drip wall segment terminates at an annular, radially inwardly-extending collecting wall segment so that the drip wall and collecting wall segments form a collecting basin for container contents splashed against the lid during shaking whereby the container contents do not drip into the sealing groove and then to the outside of the body portion after the container is shaken and the lid is removed.

In accordance with another feature of the invention, the collecting wall segment terminates at a stiffening frusto-conical wall segment extending radially inwardly and vertically downwardly toward the bottom of the sealing wall segment and the stiffening frusto-conical wall segment terminates in a centered, flat, recessed circular wall segment of the lid having sufficient area to receive a tint plug whereby the frusto-conical wall segment stiffens the lid while providing means to absorb some of the lid deformation to prevent deformation of the sealing groove when the lid is punctured prior to receiving the tint plug. In accordance with a particularly important feature of the invention, the frusto-conical wall segments of the lid and collecting basin formed therebetween provide an ingress-degree path for the contents of the container which flow from the body portion along the rim portion to the collecting basin and back to the body portion when mixing occurs in a machine imparting simultaneous twisting and vertical motions to the container so that the contents of the container are directed, during mixing, away from impingement against the sealing groove.

In accordance with another aspect of the invention the body portion of the container further includes a circular bottom seamed to the body portion preferably by a double seamed joint so that the seamed joint has a diameter slightly larger than the diameter of the lid's outer sealing wall segment. The container's bottom has a recessed annular area adjacent the seamed joint and a raised annular area radially inwardly of and adjacent the recessed area which is sufficient to permit vertical stacking of containers while permitting load bearing contact between the collecting wall segment of the lid with the raised annular area of the bottom whereby the seamed joint prevents the containers from tipping when stacked one on top of the other while the raised area in the container's bottom wall and the collecting wall segment permit load bearing weight distribution for columnar stacking of multiple containers.

It is thus another object of the invention to provide a ringless container-lid design while providing for a lid-container seal which is an improvement over the prior art.

Another object of the invention is to provide a container which meets all the dimensional requirements of standardized paint containers but is an improvement over conventional containers.

It is yet another object of the invention to provide a container-lid design which permits the containers to be stacked one on top of the other in a nested arrangement.

A still further object of the invention is to provide a metal ringless container which can be effectively sealed, in a repeatable manner, even though there is a seam in the open end of the container.

Yet another object of the invention is to provide a ringless container-lid design which is constructed to insure that the container rolls flat when placed on its side with or without the lid secured thereto.

Still another object of the invention is to provide a new container-lid design which can utilize existing, conventional machinery to fill the container, seal the lid to the container and wrap the labels around the container's side wall.

Another object of the invention is to provide a metal, ringless container which has a rigidized mouth portion that can be easily formed while providing for prying of the lid therefrom to open the container.

Yet another object of the invention is to provide a ringless container which can withstand excessive lid sealing deformation forces.

Still yet another object of the invention is to provide an improved metal ringless container design which is able to withstand excessive sealing forces without affecting the lid-container seal.

Still yet another object of the invention is to provide a ringless container which has non-closable pry points for lid removal notwithstanding excessive lid deformation forces which can be sufficient to deform the container.

Still another object of the invention is to provide a ringless container which has a mouth and rim portion which does not permanently distort to an unsealable manner notwithstanding excessive sealing forces applied to the lid.

Yet another object of the invention is to provide a ringless can-lid combination having a longitudinally stiffened rim portion with a step-down lid which insures that the rim portion will not be crushed if excessive axial forces are applied to the can.

It is still yet another object of the present invention to provide in a ringless container, a lid which is drip free.

It is yet another object of the present invention to provide a lid in combination with a ringless container which is able to withstand puncturing an opening therein for a tint pin without incurring excessive deformation and/or deformation which can adversely affect sealing between lid and container.

It is yet another object of the invention to provide in combination with a ringless container a lid which is configured to prevent low viscosity liquid contents within the container from escaping past the lid-container seal irrespective of what mixing or shaking forces are imparted to the sealed container.

It is still yet another object of the present invention to provide a container configuration which permits vertical stacking of the containers one on top of the other in long multiple container columns because of load bearing surfaces between container bottom and lid.

A still further object of the invention is to provide an improved ringless metal container.

These and other objects, features and advantages of the invention will become apparent from the following description of species thereof taken together with the accompanying drawings.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein:

FIG. 3 is an expanded view showing the cross-section of an alternative embodiment of the rim portion of the container of the present invention;

FIG. 4 is a view similar to FIG. 3 but showing the lid secured in place on the container;

FIG. 11 is a partially sectioned edge view of the preferred embodiment lid of the present invention overlying the rim portion of the preferred embodiment container which is likewise shown in a partially sectioned end view;

FIG. 12 is a partially sectioned edge view of the preferred embodiment lid of the present invention applied to the preferred embodiment container likewise shown as a partially sectioned end view;

FIG. 13 is a partially sectioned elevation view showing two vertically stacked containers;

FIG. 16 is a pictorial view of the container with its bottom cut away so that the viewer is looking into the container at the inside of the lid;

FIG. 17 is a schematic, longitudinal view showing by vector arrows the movement of the container contents;

FIG. 18 is a top plan view of the inside surface of the lid of the present invention;

It is to be noted that FIGS. 1–10 are identical to the figures used in my prior inventions described in my patents and patent applications defined in the genealogy string cited above incorporated by reference herein.

DETAILED DESCRIPTION OF THE PREFERRED EMBODIMENT

A. The Container-Lid Geometrical Relationship

Figure 1:
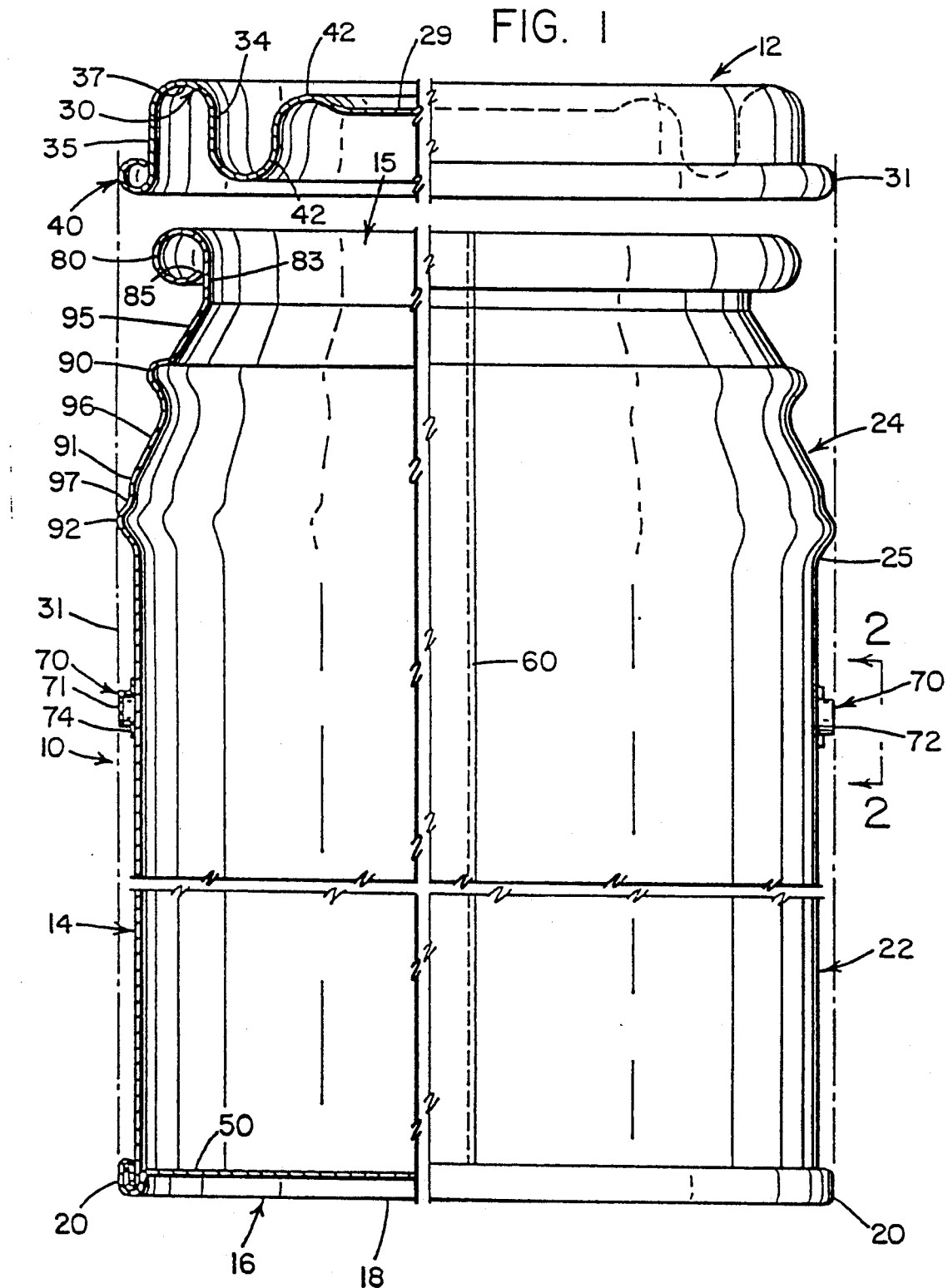
FIG. 1 is a sectioned schematic illustration of an alternative embodiment of the lid and of an alternative embodiment of the ringless container of the present invention.
Figure 2:
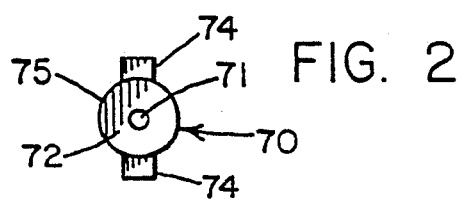
FIG. 2 is a view of the bail trunnion taken along line 2—2 of FIG. 1.

Referring now to the drawings where the showings are for the purpose of illustrating a preferred and alternative embodiments of the invention only and not for the purpose of limiting same, FIG. 1 shows a sectioned schematic illustration of a ringless container 10 and a lid 12 adapted to be secured to container 10. Container 10 and lid 12 are manufactured from tin coated sheet metal which is tempered at various temperatures and heat treat cycles to give desired physical properties. In the paint industry, the gauge of the metal is specified in pounds and containers are typically constructed from metal having gauges of 65 to 110 lbs. with heavier gauges used in larger containers and lighter gauges for smaller containers. For the one gallon container illustrated in the alternative embodiments, the gauge is 85 lbs. and for the container illustrated in the preferred embodiment, the gauge is anywhere between 85 and 95 lbs. This gauge exhibits good resiliency for the sealing characteristics of the present invention.

Container 10 includes a side wall 14 having an open end 15 and a closed end 16 defined by a bottom wall 18 secured by means of a conventional double seam 20 to closed end 16 of side wall 14. For purposes of explanation, side wall 14 may be further defined as comprising cylindrical body portion 22 and a frusto-conical rim portion 24. Cylindrical body portion 22 begins at closed end 16 of side wall 14 and terminates at the beginning 25 of frusto-conical rim portion 24 which in turn terminates at open end 15 of side wall 14.

Referring now to FIGS. 1 and 4, lid 12 is a generally circular plate pressed into the configuration of that illustrated by an appropriate die. More specifically, lid 12 has a generally flat base portion 29 and an annular sealing groove 30 formed adjacent to the peripheral edge 31 of lid 12. Sealing groove 30 is more particularly defined by a vertically-extending inner sealing wall segment 34 and a vertically-extending outer sealing wall segment 35 with a curved bight wall segment 37 connecting inner and outer sealing wall segments 34, 35. Bight wall segment 37 is formed with a predetermined radius of configuration designated as $R_2$ which will be explained in greater detail hereafter. It should be noted that inner sealing wall, bight wall segment 37 and outer sealing wall segment 35 form an inverted U-shaped groove. The peripheral edge 31 of lid 12 is curled to form a bead 40 which functions as a pry point for removing lid 12 from container 10. As shown, peripheral edge 51 of lid bead 40 is also in longitudinal alignment with the outer edge of bottom double seam 20 and, importantly, bead 40 is curled inwardly to permit container 10 with lid 12 applied to roll in a straight line for purposes of applying paper labels to filled containers 10 by means of conventional label machines. Adjacent sealing groove 30 is a rigidized groove 42. Several rigidizing grooves 42 can be provided in lid 12 so that the generally flat base portion 29 of lid 12 is rigidized. Preferably, only one rigidizing groove 42 is provided to permit some flexibility in lid 12. Lid 12 illustrated in FIG. 1 is an alternative embodiment of the lid to be used in the present invention.

Referring further to FIG. 1, bottom wall 18 is recessed, typically $\frac{1}{8}''$, adjacent double seam 20 to define an annular seating wall 50 which importantly has a diameter approximately equal to the internal diameter of cylindrical body portion 22 of container 10. The dimensional sizing of the diameter of seating wall 50 and the diameter of outer sealing wall segment 35 of lid 12 is such that lid 12 closely fits into bottom plate 18 of a stacked container. The relatively large circumferential area of seating wall 50 provides a good retention area to maintain container 10 serially stacked, one on top of the other, than that which would otherwise necessarily occur if a smaller diameter seating wall were employed. A significantly smaller diameter seating area would occur, for example, if a conventional plug-ring container was modified to achieve a similar recess for stacking purposes.

Side wall 14 is rolled, not drawn, into the cylindrical and frusto-conical configuration shown in FIG. 1 from a rectangular sheet metal plate. The longitudinally-extending ends of the flat plate are joined together into a longitudinal seam (not shown in the drawings) which extends from bottom wall 18 through open end 15 of container 10. In conventional can making processes, the longitudinally-extending ends of the rectangular plate are reversibly crimped to form U-shaped longitudinally-extending ends which are then interlocked when the plate is formed into a cylinder, crimped and soldered. Thus a soldered seam has a thickness four times that of the container's side wall. In accordance with the present invention the longitudinal seam is resistance welded by simply overlapping the longitudinal ends of the rectangular place one on top of the other. Importantly, the overlap is closely controlled to a minimum value, not in excess of 0.4 mm. When the overlap edges are resistance welded, the thickness of the welded joint is controlled to be less than twice the thickness of the container's side wall's metal, preferably about one and a half times the thickness. Thus a longitudinal seam of only about 0.4 mm is formed and the longitudinal seam is only about one and a half times the metal thickness thus causing little disruption from a sealing consideration.

Figure 3A:
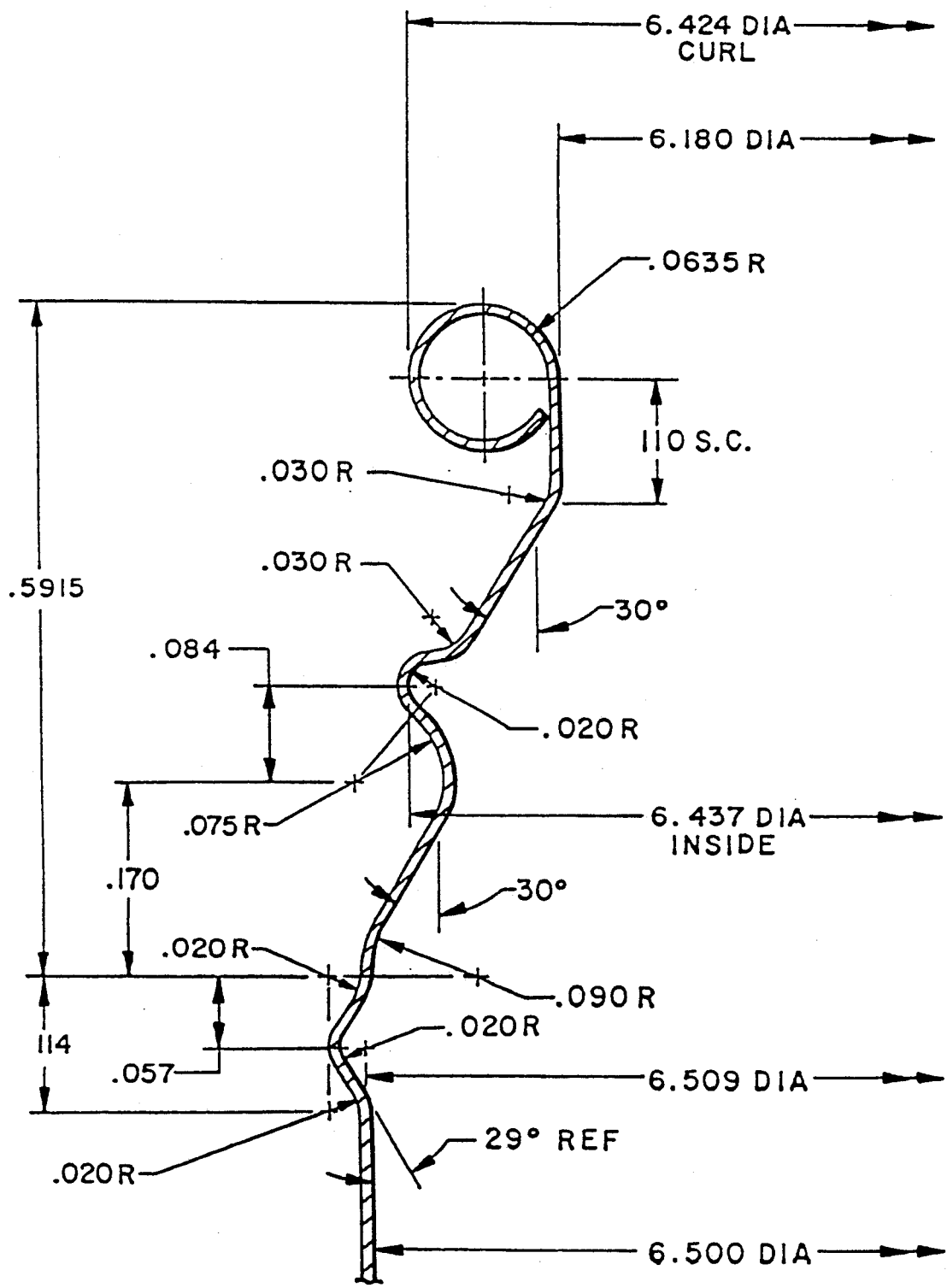
FIG. 3a is a view similar to FIG. 3 but showing the dimensional relationship for the rim portion of an alternative embodiment of a one gallon cylindrical container of the present invention.

Frusto-conical rim portion 24 is disclosed in FIG. 3 and disclosed in FIG. 3a are the actual dimensions of an alternative embodiment of frusto-conical rim portion 24 for a one gallon cylindrical container 10 which has been successfully built and tested. It is believed that the dimensions would be similarly down sized for smaller containers such as pints or quart cans and uniformly increased for larger sized containers and that the relationships between the specified dimensions are necessary for the unique functioning of the container-lid seal. In any scaling up or down of the dimensions, it is contemplated that some variations of the dimensional relationship of up to about 10 percent (10%) is permitted. This is to compensate for changes in the sheet metal gauge for different sized containers and other factors.

Referring now to FIG. 3, open end 15 of side wall 14 is curled into a circular bead 80 of a predetermined radius $R_1$. Depending from circular bead 80 is a longitudinally-extending sealing segment 83 which is parallel to cylindrical body portion 22 and positioned radially inwardly therefrom a predetermined distance. Circular bead 80 is curled in the direction shown with its free end 85 positioned against the outside surface of sealing segment 83 to permit movement or flexure of circular bead 80 when annular sealing groove 30 is wedged into sealing engagement with circular bead 80 and sealing segment 83. A generally frusto-conical, transverse segment 86 depends from sealing segment 83 and extends to the end of cylindrical body portion 22 the juncture therewith designated as line 25. Transverse segment 86 along with the flexing of cylindrical body portion 22 provides the radially deflectable means to permit the seal between circular bead 80 and sealing groove 30 to be maintained in the event of the container being subjected to shock loading. The flexibility of rim portion 24 is a function among other things of the angular relationship between transfer segment 86 and sealing segment 83 and cylindrical body portion 22. Good results have been achieved with an angular relationship of about 30° although various variations will be apparent to those skilled in the art. It should also be noted that this angle over the distance of transverse segment 86 is sized to permit the stacking concept defined above.

Significantly increasing the frusto-conical angle can result in a longitudinal downwardly deformation of rim portion 24 when lid 12 is applied over circular bead 80. To strengthen rim portion 24 against such longitudinal deformation three (3) upsets or protrusions 90, 91 and 92 are provided in transverse segment 86. It is believed that at least two such protrusions must be provided. In between protrusions 90, 91, 92 are frusto-conical portions 95, 96, 97, respectively, of transverse segment 86 and frusto-conical portions 95, 96, 97 are essentially parallel to one another to maintain the desired 30° flex relationship shown. First protrusion 90 does not extend a diametrical distance greater than that of the third protrusion 92 and functions as a pry point for a bladed tool to be inserted between rim portion 24 and bead 40 of lid 12 so that lid 12 can be removed from container 10. Third protrusion 92 also functions as a stop or a guide for the edge of the label applied to cylindrical body portion 22. Third protrusion 92 also has a diametrical distance approximately equal to that of double seam 20 to permit container 10 to be rolled in a straight line so that labels can be applied to cylindrical body portion 22 with conventional label applying machinery when lids 12 are not applied. Protrusions 90-92 rigidize transverse segment 86 against longitudinal deflection when a force is applied to lid 12 to fasten lid 12 to container 10 in a sealing manner.

FIG. 4 shows lid 12 applied to container 10. Preferably in an unassembled or "free" condition, radius $R_1$ of circular bead 80 is equal to or slightly greater than the distance $R_2$ which is the distance between inner sealing wall segment 34 and outer sealing wall segment 35 of sealing groove 30 of lid 12 so that an appropriate interference fit is formed. Also in an unassembled condition, the diameter of lid 12 from the center of bight wall segment 37 (i.e., center of radius $R_2$) is equal to or slightly smaller than the free standing diametrical distance from the center circular bead 80 (i.e., center of radius $R_1$). Preferably the diametrical differences are about 0.009". When lid 12 is applied over circular bead 80 free end 85 of circular bead 80 tends to move into a tighter curled position while transverse segment 86 of rim portion 24 is biased slightly outwardly. There is thus established a very tight interference fit between sealing segment 83 of rim portion 24 and inner sealing wall segment 34 along the entire length thereof and a small area contact (almost a line contact) between outer sealing wall segment 35 and circular bead 80. In this manner the adverse effects of side wall seam 60 which extends about circular bead 80 to form an indentation therein which hereto fore prevented air-tight sealing of ringless container lids is overcome or compensated by the resilient flexing of circular bead 80 as lid 12 is fastened thereto. A conventional sealant can be applied between the top of circular bead 80 and bight wall segment 37 of lid 12 should the container be filled with extremely liquid or watery substances such as stains and the like.

The prior art ringless paint container designs noted above provide some structural modification to rigidize the rim portion of the container against a lateral or radial direction. In Pat. No. 1,419,314 to Sexton and No. 2,060,504 to Kjellstrom the rim itself is bent over to form a U-shaped mouth with the legs extending a distance coupled with the bight wall sufficient to form a rigid mouth. In Burdick, the opening is curled in a bead as in the present invention. However, the container side wall, just below the curled opening is severely crimped or bent over onto itself to rigidize the mouth while also rigidizing the container side wall. In effect, the prior art ringless containers modified the rim portion of the container to rigidize the container's mouth and thus compensate for the rigidity of the ring which was eliminated in the design.

In contrast, the present invention's side wall and the rim portion is not rigidized. While the precise interaction between lid 12 and container 10 may not be fully understood, drop tests where the container has been dropped on its bottom wall 18 or on the edge of its bottom wall 18 have shown that the design disclosed provides better retention characteristics of lid 12 than that of conventional plug-ring devices or that certainly of prior art ringless design containers. Further, the improved sealing forces experienced in the drop tests continued to exhibit themselves until side wall 22 was physically damaged to the point where rim portion 24 in the alternative embodiment discussed above became permanently distorted. This sealing characteristic is believed to only be attributed, secondarily, to a function of the interference fit between lid 12 and rim portion 24. In contrast the interference fit is believed to be of primary significance to the air-pressurized, lid pop-off test and in the end analysis, is limited to a force which can be overcome easily by the user who must remove and reapply lid 12.

It is believed that when the container is subjected to such shock loading, the paint or liquid inside the container exerts an off center force about a discrete area on the inside of lid 12, the exact area determined by the position of the can on impact. This force is simultaneously transferred about a discrete portion of transverse segment 86. It is believed that the shock is thus dissipated in good part by the deflection of transverse segment 86 along with a deflection of cylindrical body portion 22 and a deflection of generally flat base portion 29 of lid 12 before its upward prying vector component is sufficient to release the seal established by the interference fit between annular sealing groove 30 with circular bead 80. More specifically, the interference fit established between lid 12 and circular bead 80 establishes a force 100 which is normal to inner sealing wall segment 34 and sealing segment 83 and force 101 over a line or small area contact between outer sealing wall segment 35 and circular bead 80. Normal forces 100 and 101 establish a frictional force which must be overcome to unseat lid 12. When container 10 is dropped on its edge, the force of the liquid illustrated generally by vector 105 is transmitted in part to transverse segment 86 which tends to flex or distort thus absorbing or dissipating some portion of liquid force 105 which would otherwise act to pry off lid 12. At the same time, the deflection of transverse segment 86 does not adversely act to unseat the interference fit forces 100 and 101 established between circular bead 80 and sealing groove 30. This is an entirely different action and reaction which occurs in the conventional interference fit established in a plug-ring structure. Prior art ringless designs do not utilize a flexible rim concept to maintain the seal. While the flexibility of the container design of the present invention cannot be quantified, it is inherent in the design. Thus the gauge of the sheet metal could be increased as well as the interference fit between lid 12 and rim portion 24 and transverse segment 86 even straightened (thus preventing stacking and rolling of container 10) and the design disclosed will still have some flexibility in side wall 22 and lid 12 to enhance the sealing characteristics.

Also affecting the seal arrangement of the present invention is the longitudinally-extending side wall seam inherently present in the invention. As indicated above, if the container was attempted to be drawn into its present configuration without a longitudinal side seam, rim portion 24 could not accurately be drawn within its tolerance. Thus a longitudinally-extending side seam is required. If side seam is a conventional soldered side seam, its thickness, which would amount to 4 times the wall thickness, would adversely affect sealing of circular bead 80 and prevent rolling of the rim portion 24 into its desired configuration. Thus, the side seam is resistance welded with a closely controlled overlapped on no more than about 0.04" to produce a seam when welded of approximately 1½ times the wall thickness extending no more than 0.04 mm. Rim portion 24 is then rolled, in several steps, into its present configuration to maintain its thickness substantially throughout. Specifically, necking of rim portion 24 is avoided because of inability to hold dimensional tolerances and reduction of and a consequent weakening in the wall thickness. It is thus believed that by using a resistance welded longitudinally-extending side seam, closely controlled with a minimal overlap, and a rolled as opposed to a drawn or necked rim portion 24, an acceptable seal can be effected with no adverse consequences attributed to the resistance welded longitudinally-extending side seam.

Figure 5:
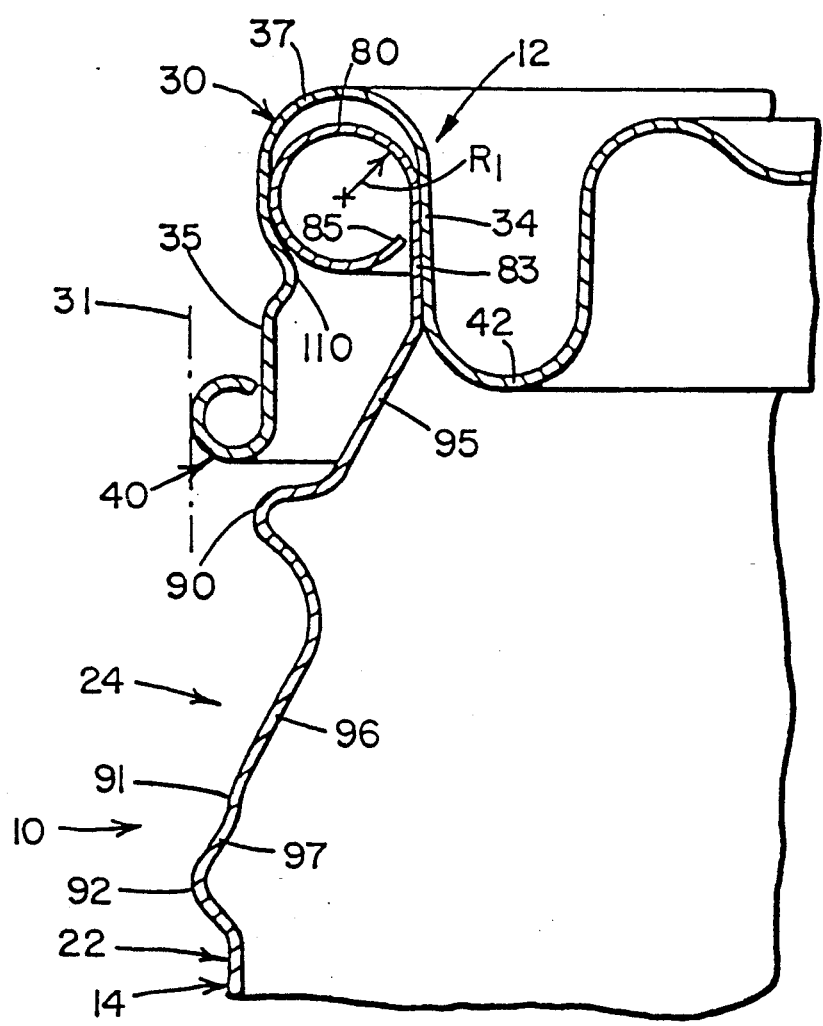
FIG. 5 is a view similar to FIG. 4 but showing a modification of the invention.

An alternative embodiment is disclosed in FIG. 5 and like numbers will identify like parts where possible. The alternative embodiment includes forming a radially inwardly projecting groove or locking indentation 110 in outer annular wall segment 35 of lid 12. The remaining geometry of container 10 and lid 12 remains the same. As shown, locking indentation 110 engages circular bead 80 below the center of its arc $R_1$ or the longitudinally extending midpoint of beaded mouth opening to provide a snapping, positive seating engagement when lid 12 is sealed to container 10. In addition, the sealing area between outer annular wall segment 35 and circular bead 80 is increased. Thus a tighter seal is provided for in the alternative embodiment of FIG. 5 than that of the preferred embodiment. FIG. 5 is shown as an alternative embodiment because it requires an additional die or an additional rolling step to be performed in the manufacturing process which is not believed necessary for most applications. However, for certain thick wall containers, say five gallon containers and the like or where the adverse effects of the longitudinally welded side seam becomes significant, the FIG. 5 embodiment may be utilized.

Referring next to FIGS. 6 through 10, the invention will now be described with respect to a preferred container profile. The same reference numerals used in explaining various parts and portions of the container-lid in FIGS. 1-5 will be used to explain the invention shown in FIGS. 6 through 10, but the reference numerals of FIGS. 1-5 when used in FIGS. 6 through 10 will be preceded by the number 2. Thus, frusto-conical rim portion designated as 24 in FIGS. 1-5 will be identified by reference numeral 224 in FIGS. 6 through 10.

Figure 6:
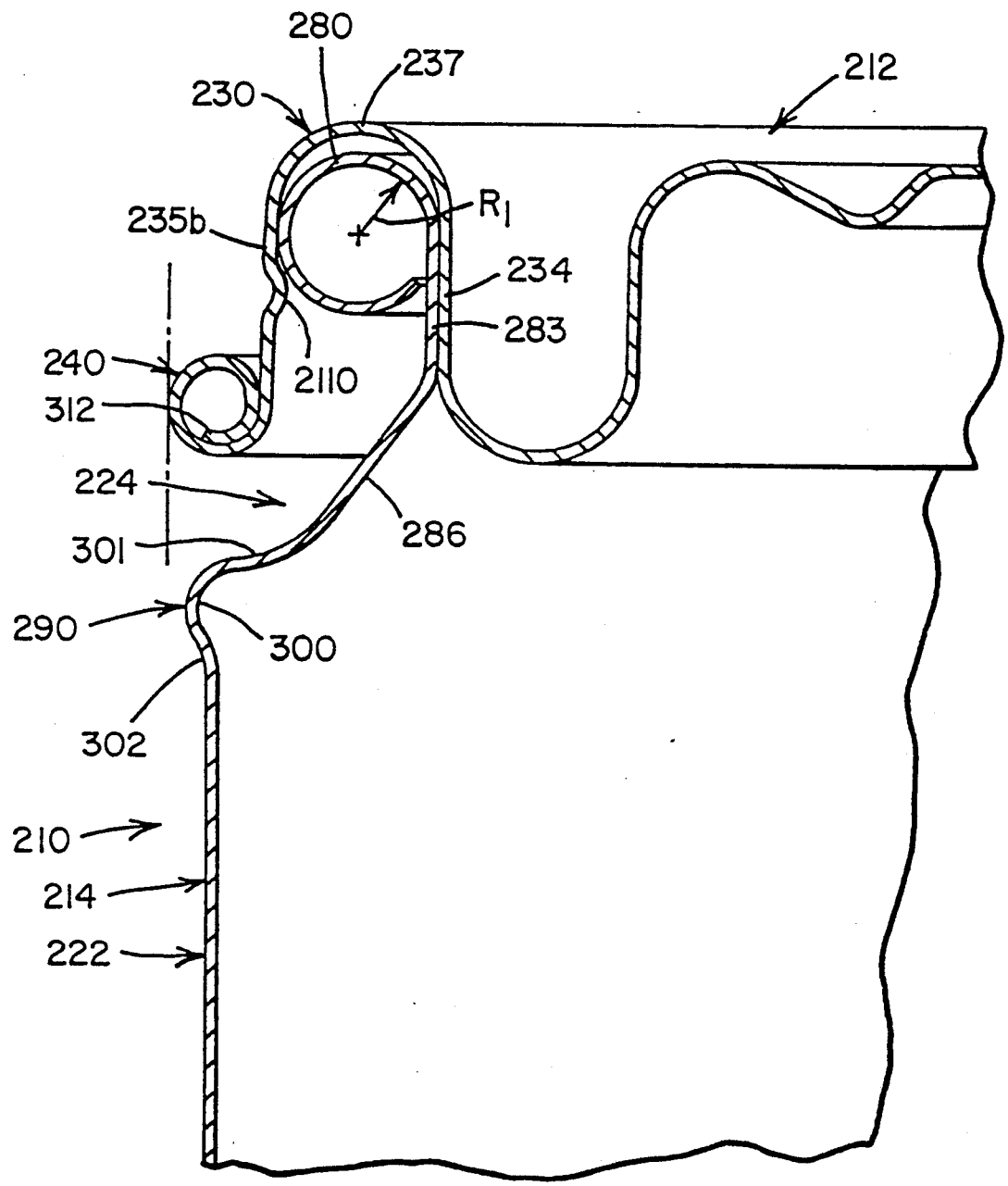
FIG. 6 is a view similar to FIGS. 4 and 5 but showing the preferred embodiment of the container profile.
Figure 7:
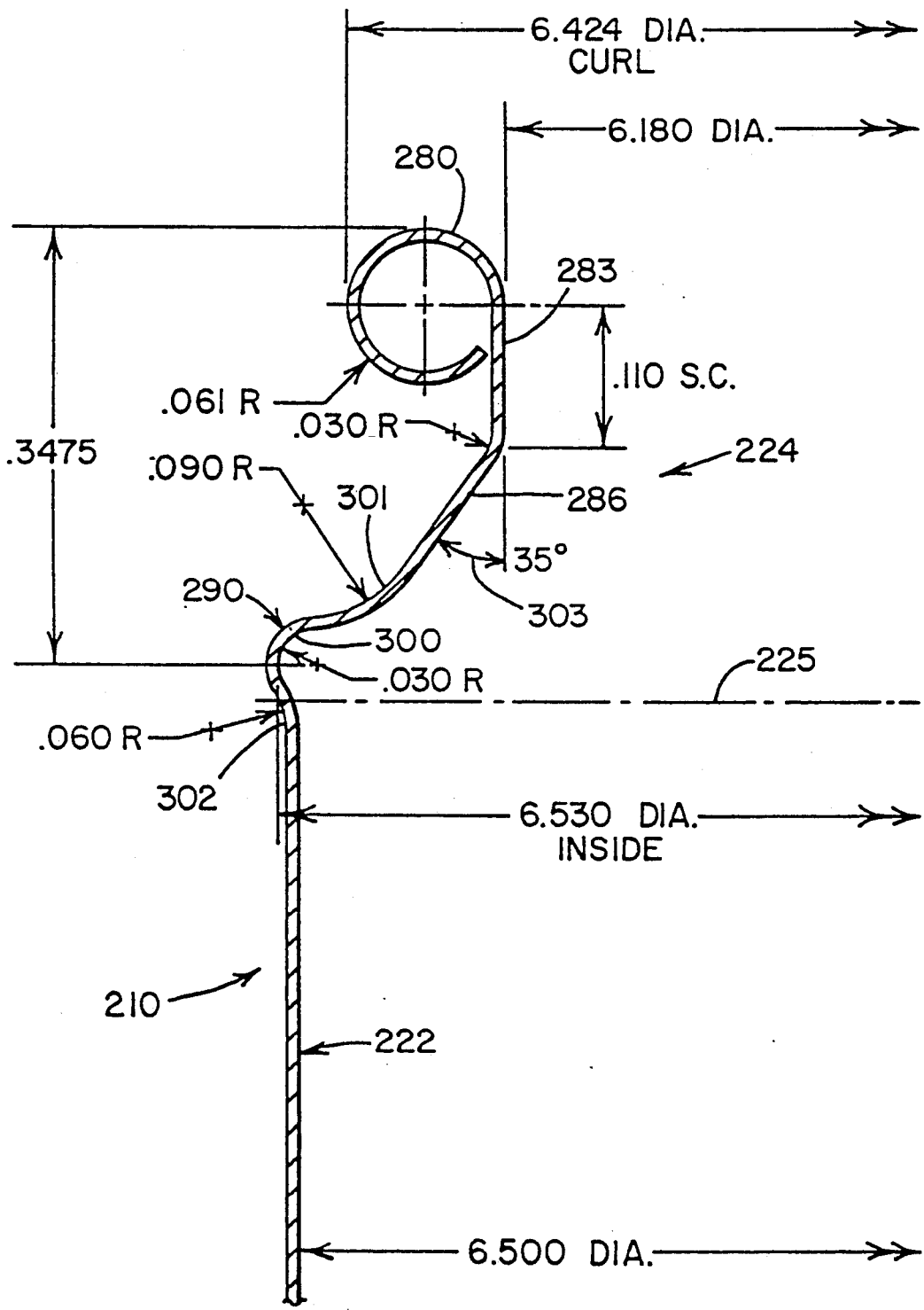
FIG. 7 is a view similar to FIG. 3a showing the dimensional relationships for the preferred embodiment of the container profile of the one gallon paint container which is illustrated in FIG. 6.
Figure 8:
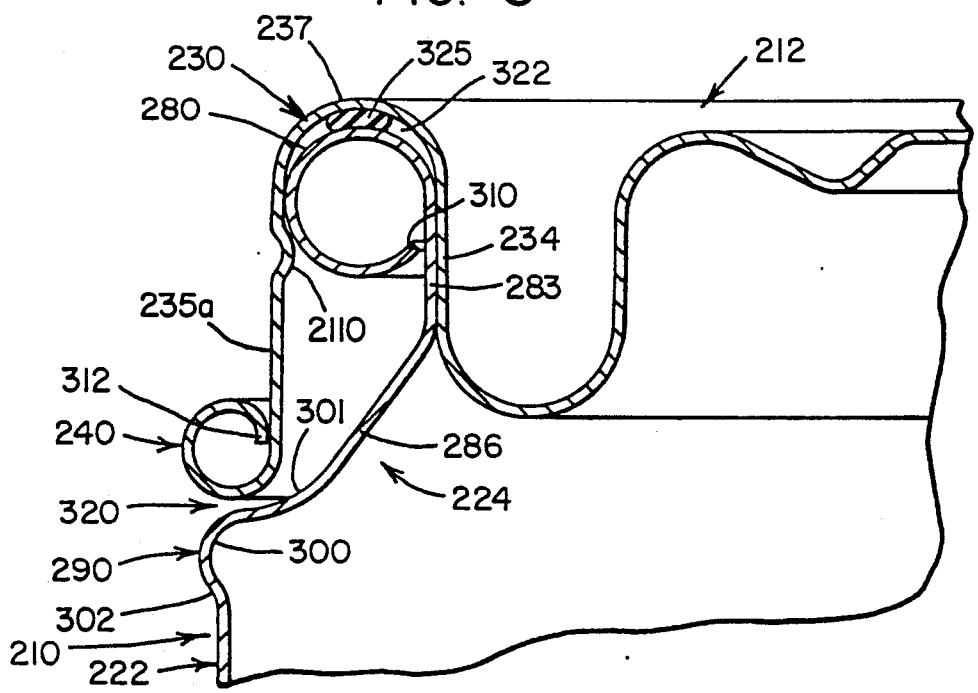
FIG. 8 is a cross-sectional view similar to the views shown in FIGS. 4, 5 and 6 but illustrating a different portion of the lid applied to the container other than that shown in FIG. 6.

Referring now to FIGS. 6, 7 and 8, the dimensions shown for FIG. 7 of the container profile is for a one gallon container. Rim portion 224 includes circular container bead 280 and depending therefrom is a longitudinally-extending sealing segment 283 which is parallel to cylindrical body portion 222 and positioned radially inwardly therefrom a predetermined distance. A generally frusto-conical, transverse segment 286 depends from sealing segment 283 and extends to the end of cylindrical body portion 222, the juncture therewith or line of demarcation between rim and body designated by dot-dash line 225. At the juncture 225 of frusto-conical segment 286 with side wall 322 is provided rigidizing means in the form of a single protrusion 290. This protrusion is a sharp annular groove formed as a reverse bend of two arcuate surfaces, specifically first arcuate surface 300 which blends into second arcuate surface 301. The first arcuate surface is struck from inside the can and is sharper or has a smaller radius as shown in FIG. 7 than second arcuate surface 301 which is defined by an arc struck from outside the container. A third arcuate surface 302 is optionally provided as a blend surface with side wall 222 at the line of demarcation 225 between rim portion 224 and the body portion of the container. The angle which frusto-conical segment 286 makes with side wall 222 and sealing segment 283 is shown in FIG. 7 as 303 and is segment 35°.

Comparing rim portion 224 of FIG. 7 with rim portion 24 as shown in FIG. 3a, the height of rim portion 224 of the container shown in FIG. 7 is significantly less than the height of rim portion 24 of the container shown in FIG. 3a. Since the container holds a fixed quantity of liquid, i.e. one gallon, the distance from demarcation line 225 to the bottom of the container for the container shown in FIG. 7 must be longer than the distance from demarcation line 25 to the bottom of the container shown in FIG. 3a. Since paper labels are conventionally applied to the body portion 222 of the container, longer length labels can be applied to the container shown in FIGS. 6 and 7 than that which can be applied to the container shown in FIGS. 1-5. In fact, the length of the rim portion of the can profile shown in FIGS. 6 and 7 is designed to provide a body length such that the same labels used on conventional ring type, one gallon cans can be used for the one gallon can shown in FIG. 7. The labels are applied at the paint manufacturer's plant by rolling the container and thus no adjustment in conventional paint labelling equipment is required nor do new labels have to be made for the invention disclosed in FIGS. 6 and 7.

As noted above, it is critical to the rigidity of rim portion 224 that the configuration be formed without significantly reducing the wall thickness of the metal. If there are many bends in rim portion 224 the tendency to reduce the wall thickness is increased. Further, since the bends are somewhat sequentially formed, the throughput of the can manufacturing line is increased if rim portion 224 has fewer bends. On the other hand, the rigidity of rim portion 224 is less than that of the double protrusion frusto-conical wall shown in FIGS. 1-5. Nevertheless, drop tests conducted with the can profile shown in FIG. 7 have proven satisfactory. This was for a can body 210 formed from 85 lbs. (0.0094") tin plate stock and can step down lid 212 formed from 95 lbs. (0.0105") tin plate stock, which is typical stock used in lids and bodies of conventional one gallon ring type containers.

B. The Step Down Lid

Figure 9:
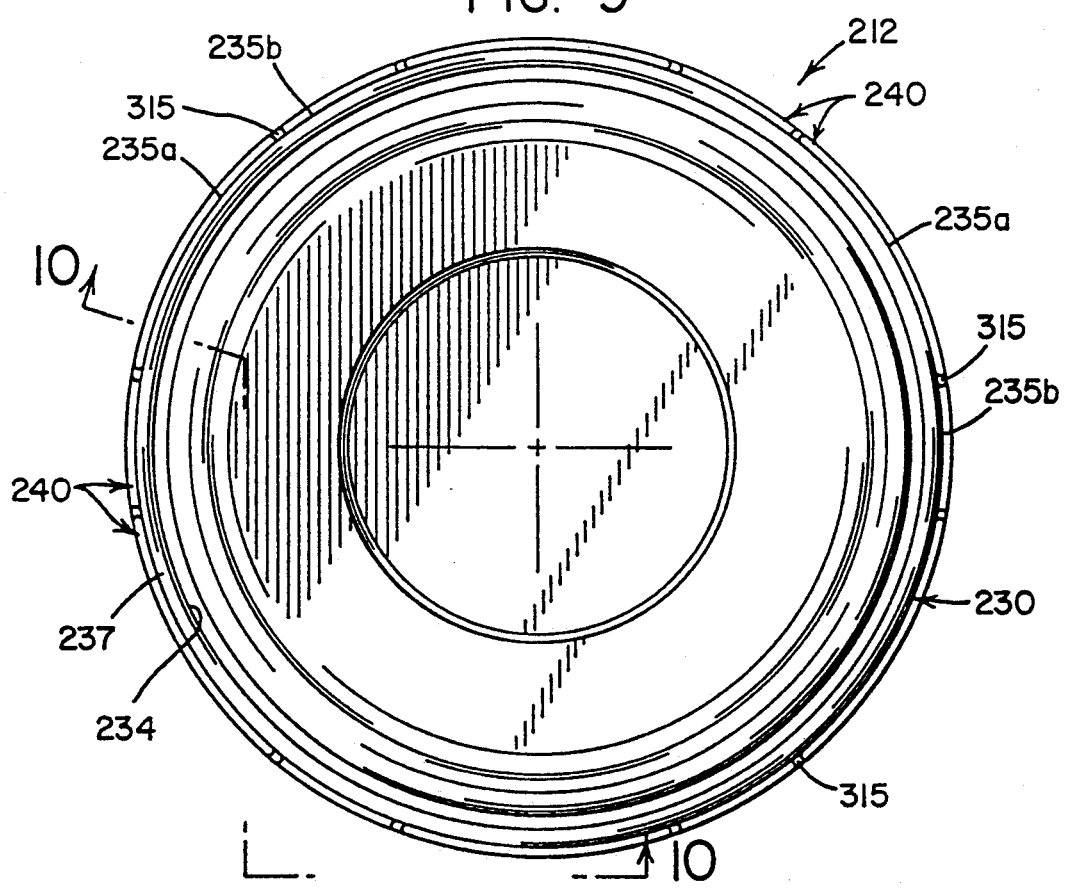
FIG. 9 is a top plan view of the lid used in the prior inventions.
Figure 10:
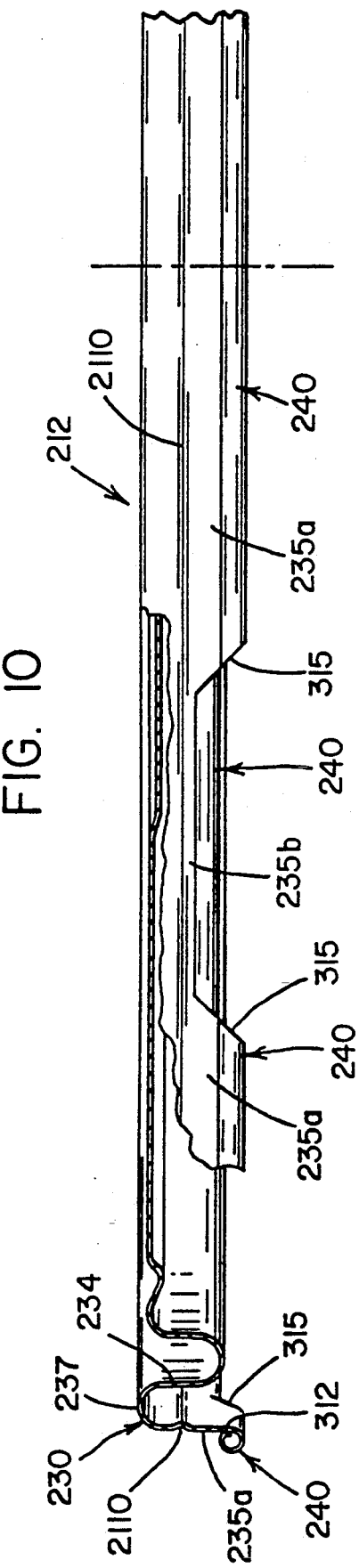
FIG. 10 is a cross-section side view of a portion of the lid of FIG. 9 taken along line 10—10 of FIG. 9.

Referring next to FIGS. 9 and 10, step down lid 212 has an annular sealing groove 230 defined by a vertically-extending inner sealing wall segment 234, a vertically extending outer sealing wall segment 235 and a curved bight wall segment 237 connecting inner and outer sealing groove wall segments 234, 235. Thus, annular sealing groove 230 is an inverted U-shaped groove and in this respect is identical to lid 12 disclosed in the alternative embodiments of FIGS. 1-5. Also, an annular indentation 2110 is provided in outer sealing wall 235 to permit lid 12 to snap over container bead 280 when the lid is applied to the container as shown in FIGS. 6 and 8. The position of indentation 2110 on outer sealing wall 235 must be such that it extends beyond or is lower than the center of the arc or radius $R_1$ or the longitudinally extending midpoint of container bead 280 when step down lid 212 is applied to container 210. The dimensioning of annular sealing groove 230 insofar as the transverse distance of bight wall segment 237 and the dimension $R_1$ of container bead 280 is concerned is identical to that disclosed in FIG. 5 and the same interference fit between annular sealing groove 230 and container bead 280 exists such that the open edge 310 of container bead 280 curls or moves in a circular fashion as step down lid 212 is applied over container bead 280. More particularly, in a normal application, after step down lid 212 has been removed from container 210, the consumer "knows" that the lid has been successfully reapplied to container 210 because he can hear and feel step down lid 212 snap over container bead 280 if step down lid 212 is simply reapplied to container 210 by using one or both hands to push step down lid 212 onto container 210. It has been known that the consumer, on occasion, will take a heavy object such as a metal hammer and beat on the lid with such force that the container side wall 222 is buckled or shoved in. The container 210 and step down lid 212 shown in FIGS. 6 through 10 contemplate such abuse and have been designed to insure that step down lid 212 and container 210 can retain its sealing characteristics and importantly, step down lid 212 can be easily removed and reapplied in a sealing manner to container 210 which, incidentally, is not possible in a ring-plug container using an interference fit to establish a seal.

This is accomplished by changing the length or depth of outer sealing wall segment 35 of lid 12 so that outer sealing wall segment 235 has a plurality of deep length outer wall sections 235a and a plurality of short length outer wall sections 235b. As best shown in FIG. 9, each deep length outer wall section 235a and each short length outer wall section 235b extends a predetermined arcuate or angular distance about the circumference of step down lid 212. In the preferred embodiment, there are six short length and six long length outer wall sections 235b, and 235a, respectively, and the total circumferentially extending distance of long length outer wall section 235a is 240° or twice the circumferentially extending distance of short length outer wall sections 235b which total 120°. From design considerations, the circumferentially extending distance of long length outer wall section 235a cannot be less than the circumferentially extending distance of short length outer wall sections 235b. That is, when the can is crushed, long length sections 235a will actually deform by increasing the total circumferential length of long length section 235, the "crushing" strength of step down lid 212 and container 210 is increased. The circumferentially extending distance of short length outer wall sections 235b is sufficient to easily insert any different type of flat bladed objects such as a coin or screwdriver to pry step down lid 212 from container 210.

The depth of long length outer wall section 235a relative to rim portion 224 is shown in FIG. 8 and the depth of short length section 235b relative to rim portion 224 is shown in FIG. 6. The bottom free end of both short and long length sections 235b, 235a is curled, radially outwardly into a lid bead 240. When step down lid 212 is formed in a die outer sealing wall segment 235 is a constant length but lid bead 240 of short length section 235b is curled or wound tighter than lid bead 240 of long length section 235a. This can best be shown no noting the different positions of bead end 312 in FIGS. 6 and 8. Curling of lid bead 240 for both long and short length sections 235a, 235b, is facilitated by slitting the bottom end of outer sealing wall 235 at an angle between adjacent short length sections 235b and long length sections 235a as best shown by reference numeral 315 in FIG. 10.

The length of long length section 235a is established so that a slight space exists between the bottom of lid bead 240 and annular stiffening protrusion or groove 290 when step down lid 212 is normally applied to container 210. This lid space is indicated by reference arrow 320 in FIG. 8. It is also to be noted that a lengthwise extending space exists between the top of container bead 280 and the bottom of the inside surface of bight wall 237. This bight wall space is generally indicated by reference arrow 322.

As discussed above, the normally assembled relative position of step down lid 212 and container 210 shown in FIGS. 6, i.e. the first position, occurs when indentation 2110 snaps under container bead 280. That is, as indentation 2110 contacts container bead 280, it causes container bead 280 to further curl until it passes the longitudinal mid-point of bead 280 and at that position bead 280 will uncurl and snap back against out sealing wall 235. This snap can be heard and felt and is positive. If a conventional sealant such as shown at 325 in FIG. 8 is applied to the mouth of container bead 280, sealant 325 is compressed and retained sealingly compressed by indentation 2110. Further, when a sealant 325 is used, a positive although somewhat resilient "stop" can be felt when bight wall segment 237 contacts container bead 280 through compressed sealant 325. Rim portion 224 of container 210 retains all the advantages, functions and features described above with reference to the alternative embodiment. Significantly, bead space 322 is equal to or greater than lid space 320.

Notwithstanding the fact that step down lid 212 is sealed to container 210 in the position shown in FIGS. 6 and 8, should an excessive force be applied to step down lid 212, lid space 320 will reduce to zero and direct contact will occur between annular stiffening groove 290 and lid bead 240, i.e. the second position. Importantly, significant contact will not occur between lid bight wall segment 237 and container bead 280. Thus, the excessive or destructive sealing force will be transferred to container side wall 222 and not to rim portion 224. Further, stiffening groove 290 has the configuration described above and reverse arcuate sections 300 and 301 in effect form a pocket which receives curled lid bead 240. Thus, the curved contact surfaces of lid bead 240 and stiffening groove 290 nests more or less within one another while permitting lid bead 240 to further curl under excessive forces which tend not to distort the geometrical relationship of rim portion 224 and to transfer the excessive sealing force to side wall 222 which then buckles. Stated another way, side wall buckling or deformation or long length seal wall 235a deformation will tend to occur first or before deformation of stiffening groove 290. In this connection, it should also be noted that curled lid bead 240 is transmitting the lid force in almost columnar alignment with side wall 222. So long as stiffening groove 290 does not deform, the geometry of rim portion 224 is not adversely affected because of lid space 322. Because excessive sealing force results from a consumer misapplication of step down lid 212 to container 210, it is reasonable to conclude that when the consumer sees container-lid deformation, the consumer will stop beating on the lid. Thus, the effectiveness of the seal between step down lid 212 and container 210 is not adversely effected and step down lid 212 can still be removed and reapplied with a seal still existing between step down lid 212 and container 210. In fact, if a resilient sealant 325 is used, it is possible after the excessive force has been applied, for sealant 325 to slightly move step down lid 212 to establish a slight space although smaller than "normal" space 320 shown in FIG. 8.

It should be noted that lid sealing following can deformation is not possible with a conventional ring type can using a lid or plug which is wedged into sealing contact with grooves formed on the ring. When the plug on a ring type can is hit with such a force that its side wall is shoved in, the seal resulting from the interference fit between plug and ring groove is permanently distorted and lost. However, the lid on a ring container can still be removed and reapplied even if the seal is lost. Furthermore, the rigidity of the ring increases the columnar strength of the container. In prior art ringless can designs, the lid could not be easily removed from the container. This does not happen in the present invention because the pry space between short length section 235b and annular stiffening groove 290 as shown in FIG. 6 is never reduced to the extent where a flat bladed object could not be easily inserted into the space even though space 320 in FIG. 8 is reduced to zero.

Excessive vertical lid closing forces occur in two instances. First, the consumer beats on the lid with a hammer with impact forces sufficient to collapse the can. Secondly, cans are misapplied in shakers used in paint stores. (Lid applications at the paint factory are no problem because closure force is controlled.) Old can shaker designs which fasten the can to the shaker unit by manually turning a screw thread, do not present any problem since a manual force sufficient to deform the container cannot be applied. Conventional shakers have automatic closing mechanisms which automatically grip the can with a predetermined axial load. The axial or longitudinal load is regulated by an electronic sensing circuit. One gallon paint shakers limit the load at about 250 lbs. Five gallon shakers increase the loading to about 500 lbs. and in the case of one manufacturer to 750 lbs. Five gallon shakers have and are used to mix one gallon cans, sometimes in multiple units. Despite the published load limits, one U.S. manufacturer's five gallon shaker has been observed to place axial load limits of up to 1100 to 1400 lbs. on a can and in at least one instance an observed load was in excess of 1800 lbs. Axial load tests were conducted on the can of the subject invention as well as on the standard one gallon ring-type can for a basis of comparison. For standard ring-type one gallon cans, the can deforms at about 1500 lbs. in that a deformation starts to occur and at 2200 lbs., the ring-type can is buckled at its side wall midpoint. Axial loading was applied to the rim portion of containers 10 and 210 without a lid manufactured from standard 95 lb. weight tin stock. Deformation of container 10 (FIG. 3a) occurred at an average load of 999 lbs. with a total range (high and low) of 97 lbs. Deformation of container 210 (FIG. 7) occurred at an average load of 882.25 lbs. with a total range (high and low) of 111 lbs. Strength of container 10 with its double rigidizing grooves is thus stronger than container 210 with its single rigidizing groove as noted above. However, the strength of the profile of container 210 is more than sufficient to withstand axial loads imposed by five gallon shakers if such loads are kept within published limits. That is, under any normal shaker operation, long length outer wall sections 235a serve no support function and the total load is withstood by the profile of the container. Also, at this load, the container profile can withstand any "normal" hammer beating since hammering is a dynamic as opposed to a static loading and a heavy weight hammer would have to be used. With the static columnar loading test repeated with a standard 95 lbs. tin weight lid applied to container 210 and at a loading of about 1500 lbs., long length sections 235a began to deform and continued loading squashed outer sealing wall 235 into stiffening groove 290 before side wall 222 buckled. The disclosed design was fixed at this load because five gallon shaker loads, even for the one malfunctioning machine which applied a one time load of 1800 lbs., do not for all intents and purposes, exceed a loading of about 1400 lbs. Also, at this loading, subjectively, the consumer would have to beat the can in a clearly excessive manner to cause collapse of outer sealing wall 235. Additionally, if the fotal circumferential distance of long length outer sealing wall sections 235a were increased and the weight of step down lid 212 increased to 110 lbs., which is still a conventional weight in the industry, columnar strength of can 210 or 10 would closely equate to that of the plug ring can. Finally, as the consumer becomes familiar with can 10 and 210 and realizes that the step down lid 212 can be reapplied with a simple hand-applied force, beating the can with any hammer is less likely to occur. Preliminary marketing tests have indicated that the can was readily accepted by professional painters who cleaned the cans for re-use during painting and for keeping products not completed used up for re-use on subsequent jobs.

The step down lid 212 of the present invention is designed principally as a preventative measure to insure that the seal of the container is not adversely affected if the can is abused. The desired sealing action attributed to the longitudinal rigidity of stiffening groove 290 in combination with the radially inwardly taper of rim portion 224 permits an extremely effective seal which is more than able to withstand drop tests and the like as discussed above. This geometrical relationship is not interfered with by step down lid 212 but instead is protected when an abusive condition is present. Thus, while it is conceptually possible to design long length section 35a to "normally" contact strengthening groove 290, in order for a seal to be consistently established between container bead 280 and step down lid 212, some "normal" space 320 will or should always be provided. In accordance with the preferred embodiment of the present invention, sealant 325 is actually a foam gasket formed in place which takes up "normal" space 320 to provide cushioning of the excess force and a good, lid-restoring positional force while also insuring hermetic sealing of the container contents. Such a foam seal is available under the brand name "Foamix" from the Nordson Corporation. Other foam, formed-in-place gaskets can be used.

C. The Drip Free Lid

Referring now to FIGS. 11–13 and 15, the drip free lid 412 has an annular sealing groove 430 formed at its outer peripheral edge. Annular sealing groove 430 includes a vertically extending, inner sealing wall segment 434, a vertically extending, outer sealing wall segment 435 and a bight wall segment 437 longitudinally extending therebetween. Inner and outer sealing wall segments 434, 435 and bight wall segment 437 are identical to that discussed for the step down lid shown in FIGS. 9 and 10 and will not be described or discussed further. Extending from the bottom of inner sealing wall segment 434 is a frusto conical drip wall segment 440 extending radially inwardly towards the center 441 of lid 412 and vertically upwardly towards bight wall segment 437. An annular generally flat collecting wall segment 442 extends radially inwardly from the end of frusto conical drip wall segment 440 and terminates at a stiffening frusto conical wall segment 443. Stiffening frusto conical wall segment 443 extends radially inwardly towards center 441 of lid 422 and vertically downwardly away from bight wall segment 437 towards the bottom of inner sealing wall segment 434. Stiffening frusto conical wall segment 443 in turn terminates in a generally flat, recessed circular wall segment 446 which occupies the central area or portion of lid 412.

Frusto conical drip wall segment 440, stiffening frusto conical wall segment 443 and collecting wall segment 442 form a collecting basin 444 in which liquid contents of the the container collect when lid 412 is removed from the container and flipped upside down. Frusto conical drip wall segment 440 forms an ingress angle shown by reference numeral 448 in FIG. 11 and stiffening frusto conical wall segment 443 forms an egress angle shown as reference numeral 449 in FIG. 11. In the preferred embodiment and for a one gallon paint container the height of inner sealing wall segment 434 is 0.227 inches which is measured from the bottom of inner sealing wall segment 434 to the top of bight wall segment 437. Relative to the top of bight wall segment 437 collecting wall segment 442 is recessed 0.030 inches and circular segment 446 is recessed 0.130 inches. The longitudinal or radially-inward distance which frusto conical drip wall segment 440 extends is about 0.375 inches and the longitudinal or radially-inward distance which stiffening frusto conical wall segment 443 extends is about 0.239 inches. The dimensions establish an ingress angle 448 of about 27 degrees and an egress angle 449 of about 23 degrees.

As thus far explained, lid 412 because of frusto-conical drip wall segment 440 tends to avoid container contents from collecting in annular sealing groove 430 when lid 412 is removed from the container. The container is usually shaken to mix the paint inside prior to removing lid 412 and container contents splash against lid 412. In the original design as perhaps best shown in FIG. 1, rigidized groove 42, which resembles somewhat the plug on a ring can protrudes furthest into the container and would have paint dripping therefrom when lid 12 was removed from the container with the result that some paint could collect in annular sealing groove 30. If lid 12 was not flipped over completely but was placed to rest in an inclined upside-down position, a sufficient amount of paint could collect in annular sealing groove 30 to actually leak onto the outside of the container when the lid was reapplied to the container. This no longer occurs in the drip free lid 412 shown in FIGS. 11–13 and 15 because the furthest most protruding point of the lid is the inner sealing wall segment 434 which extends into drip wall segment 440. Thus drip wall segment 440 directs the paint to flow into collecting basin 444 which collects the paint even if the lid rests on an inclined surface. In fact, a frugal consumer will so utilize the drip free lid 412 to collect the paint from lid 412.

Figure 20:
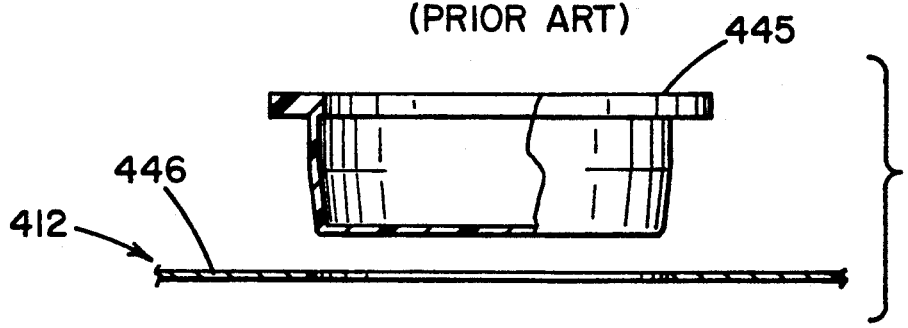
FIGS. 20 and 21 are partially sectioned elevation views of a conventional tint plug shown in an unapplied position (FIG. 20) and an applied position (FIG. 21).
Figure 21:
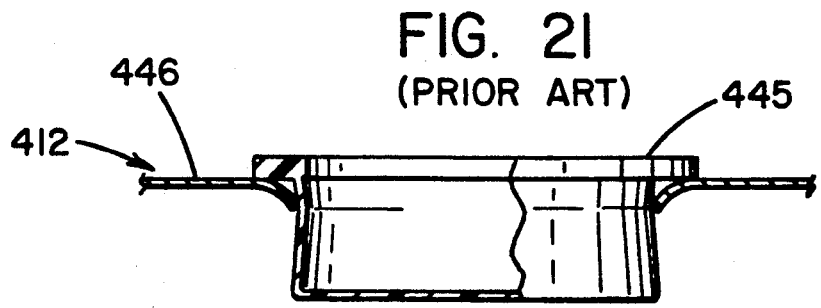

When the central portion of any paint container lid is pierced to provide a rather large circular opening for insertion of a plastic tint plug 445 (FIGS. 20, 21), there will be some distortion of the lid resulting from the piercing action of the press as described above. To some extent this distortion is insensitive to the thickness of the metal used for the lid. It is conventional practice to provide rigidizing grooves in the lid of any container so that the lid retains it shape. When lids with the rigidizing grooves formed therein are subjected to the piercing action for tint plug 445, the distortion or metal upset resulting from the piercing action of the die does not result in distorting the grooves but simply causes distortion of the lid beyond the grooves. In other words the die which results in buckling the center portion of the lid must cause some movement throughout the lid since the rigidizing grooves are not distorted and compensation is taken up by lid movement at other places. As noted in the Background, in a ring can application, the plug which establishes an interference fit with the grooves in the ring simply becomes further wedged as a result of the lid distortion. In a ringless can and in any ringless can, the distortion could result in a lessening of the sealing forces between the curled bead and the inner and outer sealing wall segments. That is, the sealing force could be increased over some circumferential portion of the lid and container and decreased over some other circumferential portion of the lid and container depending upon the upset of the metal in the lid resulting from the piercing action of the die. Drip free lid 412 can be viewed as replacing the rigidizing grooves in the prior art lids with frusto conical drip wall and stiffening segments 440, 443. The distortion which is inevitable, is then taken up by the inclined angles 448, 449 of the frusto conical wall segments 440, 443 so that the distortion forces are not transmitted to annular sealing groove 430. In other words, unlike the prior art where the rigidizing grooves resisted the deformation, the frusto conical segments 440, 443 somewhat absorb the deformation by changing their inclined angle. This distortion is taken into account by setting the angles at the limits specified above. The angle also establishes the load bearing rigidity of collecting wall segment 443. Thus, the sealing forces established between the beaded mouth of the container and annular sealing groove 430 are not affected by the distortion that had been occurring when the center of drip free lid 412 is pierced by the tint plug die.

Referring now to FIG. 13 bottom wall 418 of container 410 is secured by means of a conventional double seam 420 to the body. Adjacent double seam 420 is an annular recess 450 which extends to the same depth as that disclosed in the earlier discussed embodiments and functions for the same purpose as described earlier. That is, annular recess 450 receives bight wall segment 437 to permit stacking of containers 410 in a manner which prevents tipping. Adjacent annular recess 450 and extending radially inwardly towards the center container bottom 420 is a flat annular raised area 452. Annular raised area 452 terminates in a circular recessed area 454. Annular raised area 452 and recessed area 454 correspond to collecting wall segment 442 and recess circular wall segment 446 of drip free lid 412. When the containers are stacked, annular raised area 452 of the container bottom contacts collecting wall segment 442 of lid 412 to provide a load bearing area of support for the stacked containers. In the alternative embodiments discussed above the load rested on bight wall 37. In the preferred embodiment disclosed for the drip free lid 412 of the present invention, contact can still occur between bight wall 437 and annular recess 50, (or alternatively contact need not occur) but annular raised area 452 and collecting wall segment 442 provides the load bearing support area permitting safe, vertical stacking of cans in long columns while double seam 420 and outer sealing wall segment 435 prevents container tipping when stacked. It should also be noted that the load bearing area is adjacent to the peripheral edge of the container and thus the bearing area is large. Thus, the bearing area coupled with annular recess 450 permits the containers to be stacked in rather long vertical columns in a safe, semi-interlocked manner when filled with paint.

Referring now to FIGS. 16, 17 and 18 it can be seen from the views illustrated that collecting basin 444 is actually operating as a funneling mechanism. These views should be contrasted with the alternative embodiments of the container-lid combination disclosed in FIGS. 5 and 6. As discussed in the Background, the Harbil shaker operates to spin the container while the container is in an orbital motion. The spinning motion exerts a centrifugal force to the paint inside the container which directs the paint against the container side wall while the vertical motion can be viewed as walking the paint up and down the sidewall until the paint impacts lid 412. Thus, the force of the paint is being directed against the rigidized groove 42 and the rim portion 24 of the container so that the paint impacts the seal established between inner sealing wall 34 and curled bead 80. If the paint (i.e. stain of watery liquid consistency), is being mixed in a Harbil or Harbil type paint shaker which has had the lid 12 distorted by a tint plug, it is potentially possible for the watery stain to leak past the gasket seal. In contrast, collecting basin 444 of the present invention with its ingress and egress angles 448, 449 actually operate to direct the container contents to flow away from inner sealing wall segment 434 and back into the container. This not only counteracts the adverse affects of the paint shaker, but it also enhances the paint mixing abilities of the shaker in comparison to conventional, flat paint can lids. Container content flow is indicated by the arrows shown in FIGS. 16, 17 and 18 for the Harbil shaker.

Figure 14:
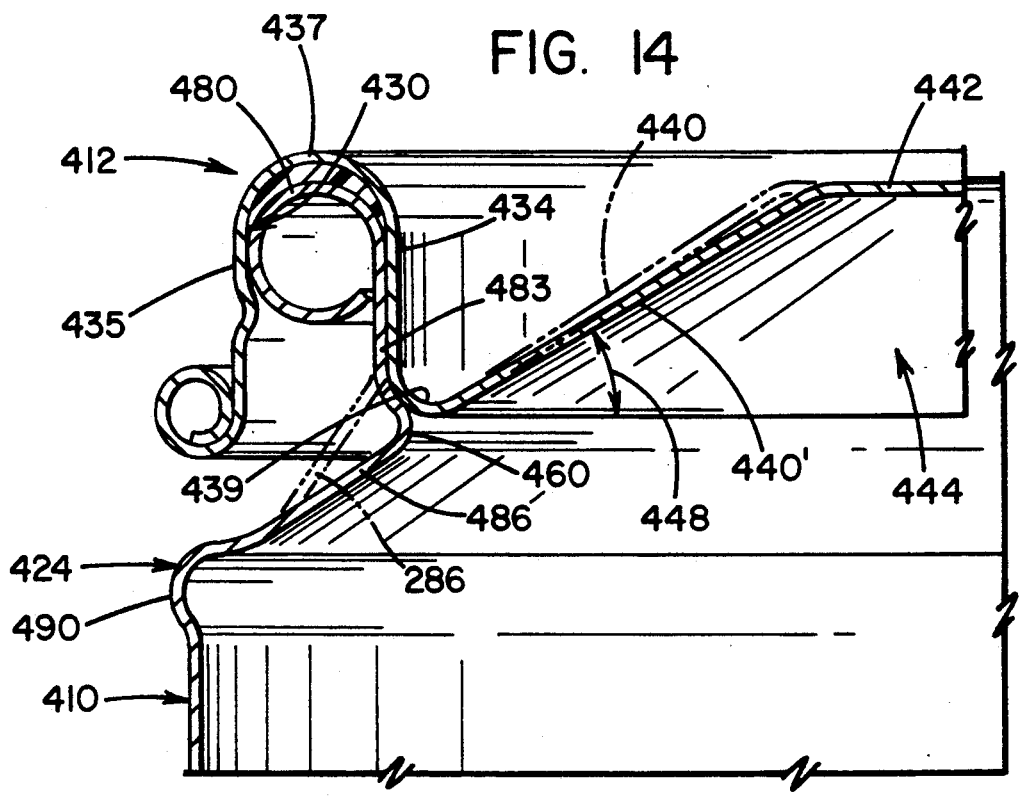
FIG. 14 is a partially cross-sectioned, elevation view showing an alternative embodiment of the lid of the present invention applied to an alternative embodiment of the rim portion of the container of the present invention.
Figure 15:
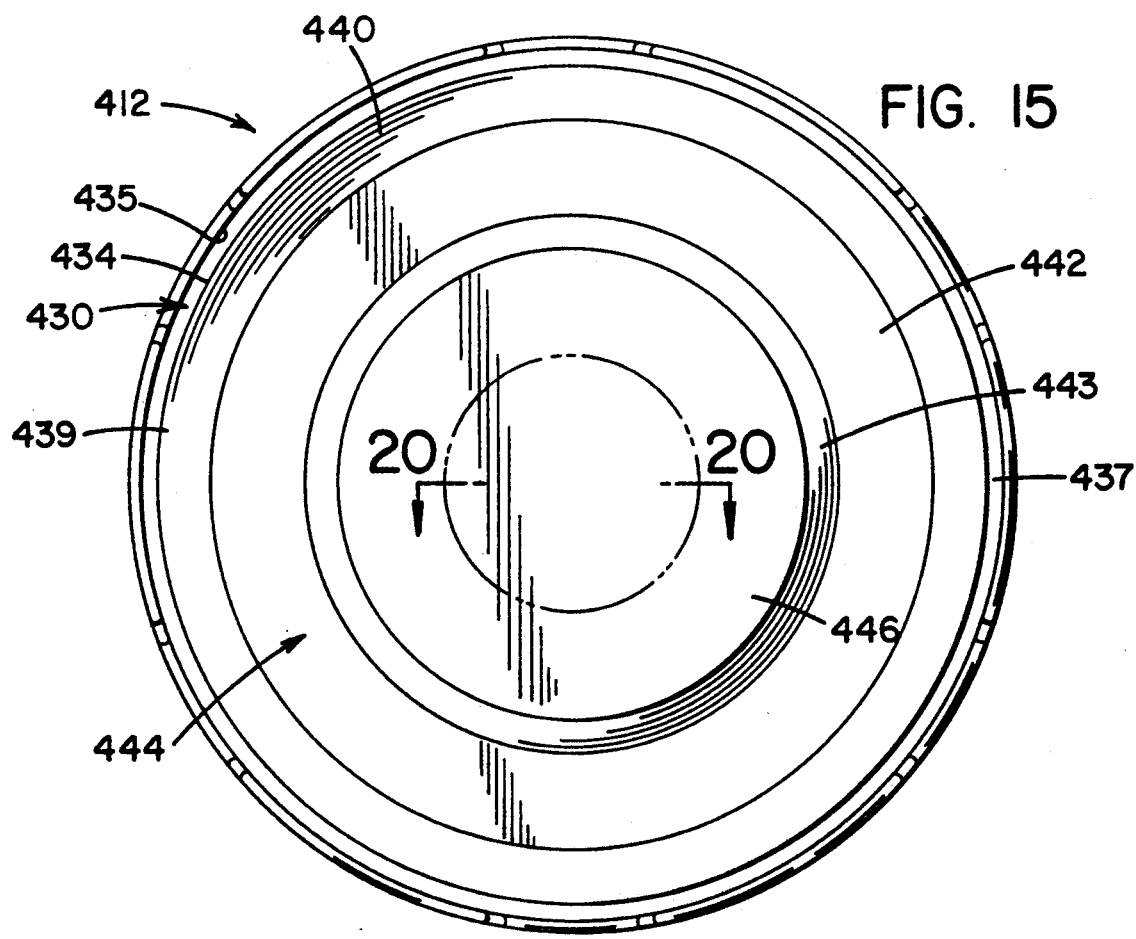
FIG. 15 is a top plan view of the lid of the present invention.
Figure 19:
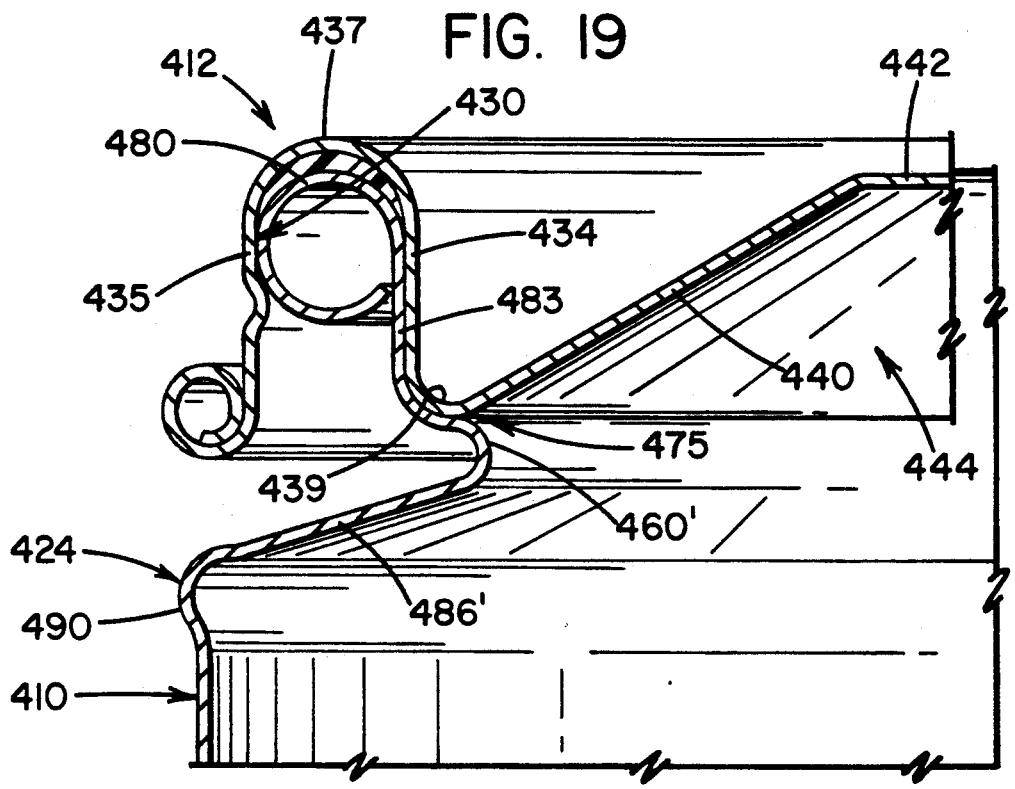
FIG. 19 is a partially cross-sectioned elevation view similar to FIG. 14 showing a second, alternative embodiment of the present invention.

Referring now to FIGS. 14 and 19 there is shown alternative embodiments which may be made to the rim portion 424 of the container 410 for use with drip proof lid 412 and like reference numbers used in describing the preferred embodiment disclosed in FIGS. 11–13, 15 will be used in describing the alternative embodiments where possible. In both embodiments the rigidizing means is a single protrusion 490 which is identical to the single protrusion 290 illustrated in FIGS. 6, 7 and 8. , The containers transverse segment 486 in FIG. 14 and 486' in FIG. 19 in the alternative embodiments is different than transverse segment 286 of the preferred embodiment which is shown in dot-dash line in FIG. 14 for reference purposes.

In FIG. 14 transverse segment 486 is set at an angle to be coincident with ingress angle 448 and in fact the dimensional relationship is such that the transverse segment 486 is coaxial with frusto conical drip wall segment 440' (for the embodiment disclosed in FIG. 14, frusto conical drip wall segment 440 described in FIGS. 11–13, 15 is shown in dot-dash lines for reference purposes). The juncture then between longitudinally extending sealing segment 483 and transverse segment 486 is formed as an "S" bend 460 to nest with accurate surface 439 which blends frusto conical drip wall segment 440 into inner sealing wall segment 434 of drip free lid 422. The alternative embodiment disclosed in FIG. 14 thus enhances the ingress-egress motion of the paint during mixing while the "S" bend arrangement 460 minimizes any risk of the paint entering annular sealing groove 430.

In the alternative embodiment disclosed in FIG. 19, the angle of transverse segment 486 is reduced to a lesser angle than egress angle 448 so the transverse segment 486' forms a stepped space 475 inwardly from drip wall segment 440. This arrangement provides a longer "S" bend 460' and forces the contents of the container to be splashed or swirled away from the sealing juncture between inner sealing wall segment 434 and longitudinally extending surface 483.

It should be noted that because of the lesser inclined angles of transverse segments 486, 486' of the alternative embodiments of FIGS. 14 and 19, rim portion 424 will not have the rigidity in the longitudinal or vertical direction as does the rim portion of the preferred embodiment. However, both alternative embodiments illustrate arrangements in which sealing between curled bead 80, 480 and annular sealing groove 30, 230 and 430 is assured no matter what paint shaking mechanism or process is used thus retaining the essential features or characteristics of the subject invention.

Having thus described the invention it is apparent that many modifications and alterations may be made thereto without departing from the spirit or essence of the invention. For example, the invention has been disclosed and explained with reference to cylindrical metal containers where the invention has particular uniqueness and application. However, and in concept, a scaled down rim and lid could be applied to a cylindrical opening formed in an oblong or "F" shaped container having a rectangular top. Furthermore, the invention has been described with reference to paint containers where it has particular application. However, the container is, of course, suitable for other applications such as coffee cans, peanut cans and the like where the resealable characteristics of the container and the stacking feature assume significance. It is intended to include all such modifications and alterations insofar as they fall within the scope of the invention.

Having thus defined the invention, it is claimed:

1. The combination of a metal container with a removable, resealable lid for sealing liquid contents therein comprising:

a) a container having a cylindrical body portion, a mouth opening formed as a curled bead and a rim portion extending from said mouth opening to said body portion, said opening smaller in diameter than said body portion so that said rim portion tapers therebetween, stiffening means at said rim portion tapers therebetween, stiffening means at the juncture of said rim portion with said body portion for strengthening said rim portion;

b) a lid having a generally circular configuration with an annular sealing groove extending about its periphery, said sealing groove defined by annular, vertically extending inner and outer sealing wall segments with a bight wall segment longitudinally extending therebetween; said inner sealing wall segment terminating in an annular, frusto-conical drip wall segment extending radially inwardly and vertically upwardly towards said bight wall segment; said frusto-conical drip wall segment terminating at an annular, radially-inwardly extending collecting wall segment, said drop wall and said collecting wall segment forming a collecting basin for container contents splashed against said lid during shaking whereby said contents do not drip into said sealing groove nor on the outside of said body portion after said container is shaken and said lid is removed; and said outer sealing wall segment has a plurality of longitudinally extending long length and short length sections, each section extending a predetermined arcuate distance about the circumference of said outer wall segment; said stiffening means including an annular stiffening groove at the juncture of said body portion and said rim portion; said long length sections overlying said stiffening groove when said lid is assembled to said mouth and adapted to contract said stiffening groove should excessive sealing forces be applied to said lid whereby said body portion in combination with said stiffening means prevents said container from deforming in a non-resealable manner.

2. The container of claim 1 wherein said lid has an annular, radially inwardly extending indentation formed in said outer wall segment and said lid has first and second sealed positions relative to said container, said first sealed position defined by said indentation located at a point below the longitudinal midpoint of said curled bead whereat said curled bead snaps back into contact with said outer sealing wall segment and having a normal space vertically extending between said annular stiffening groove and the bottom of said lid's long length sections, said normal space not greater than the vertical distance between said bight wall and the top of said curled bead when said lid is in said first position and said second position defined when the bottom of said lid's long length section contacts said stiffening groove whereby said rim portion of said container is not sealingly deformed.

3. The container of claim 2 wherein a resilient sealant is applied to the top of said bead and normally fills a portion of the lid space between the top of said bead and said bight wall when said lid is in said first position, said sealant urging said lid from said second position to said first position after application of said excessive sealing force.

* * * * *